United States Patent [19]
Bredenberg

[11] Patent Number: 5,826,253
[45] Date of Patent: Oct. 20, 1998

[54] DATABASE SYSTEM WITH METHODOLOGY FOR NOTIFYING CLIENTS OF ANY ADDITIONS, DELETIONS, OR MODIFICATIONS OCCURRING AT THE DATABASE SERVER WHICH AFFECT VALIDITY OF A RANGE OF DATA RECORDS CACHED IN LOCAL MEMORY BUFFERS OF CLIENTS

[75] Inventor: David Bredenberg, Acton, Mass.

[73] Assignee: Borland International, Inc., Scotts Valley, Calif.

[21] Appl. No.: 635,133

[22] Filed: Apr. 19, 1996

Related U.S. Application Data

[63] Continuation-in-part of Ser. No. 506,944, Jul. 26, 1995.
[51] Int. Cl.⁶ .................................................. G06F 17/30
[52] U.S. Cl. .................................... 707/2; 707/1; 707/10; 707/7; 707/8; 707/100; 711/100; 711/103; 364/283.4; 364/282.4
[58] Field of Search .................................... 395/608, 607; 707/8, 1, 2, 10, 101, 100; 364/282.4, 283.4; 711/100, 113

[56] References Cited

U.S. PATENT DOCUMENTS

| | | | |
|---|---|---|---|
| 4,897,781 | 1/1990 | Chang et al. | 364/200 |
| 5,133,075 | 7/1992 | Risch | 395/800 |
| 5,151,989 | 9/1992 | Johnson et al. | 395/600 |
| 5,493,728 | 2/1996 | Solton et al. | 395/250 |
| 5,555,388 | 9/1996 | Shaughnessy | 395/427 |
| 5,617,568 | 4/1997 | Ault et al. | 395/612 |
| 5,628,005 | 5/1997 | Hurvig | 395/608 |

*Primary Examiner*—Thomas G. Black
*Assistant Examiner*—Jean M. Corrielus
*Attorney, Agent, or Firm*—John A. Smart

[57] ABSTRACT

Client/server system and methods are described for providing a "cache range" to database clients. When one or more records in a cache range of a client change, a server in connection with the client sends a notification that the cache range has changed. Instead of the client taking a lock out for updating a record, the client simply indicates to the server which records it is interested in (e.g., via registering an event alerter request), whereupon the server manages its resources as necessary to notify the client of a change in one of the records which is of interest to the client. The server can simply take out "interest" locks on the corresponding records; these are not locks which exclude the resource from other clients. Other clients are not prevented from accessing this resource (i.e., the records which are of interest). The interest lock is employed in conjunction with the registered event alerter for notifying the client when a range of records of interest is updated by another client. In this manner, the server undertakes action to indicate to the client when the client local buffer might be stale, thereby providing improved local record buffer management in a client/server database context.

38 Claims, 16 Drawing Sheets

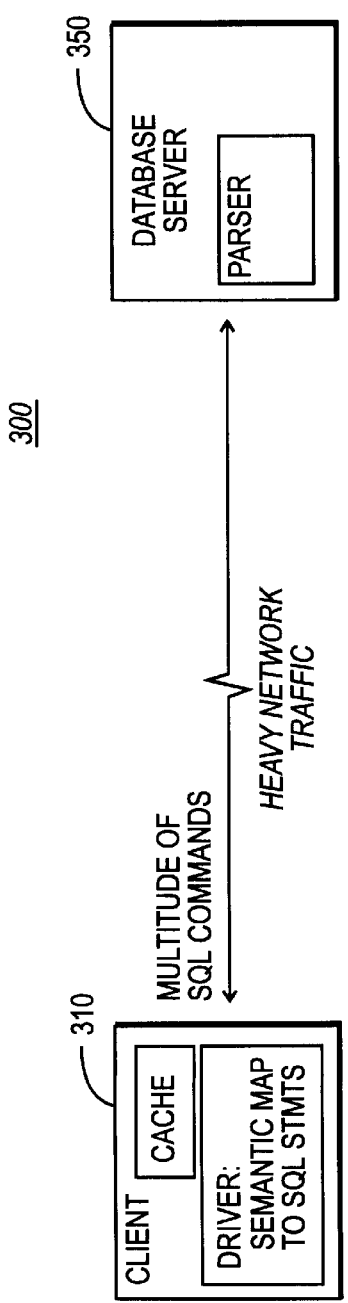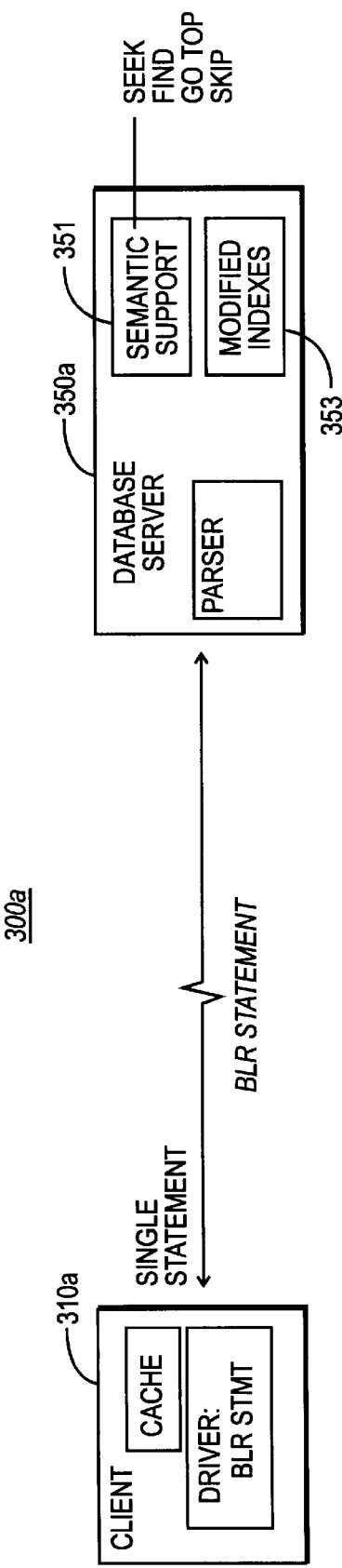

PREFIX COMPRESSION 440

| KEY VALUE | PREFIX LENGTH | DATA LENGTH | DATA |
|-----------|---------------|-------------|------|
| ABC       | 0             | 3           | ABC  |
| ABD       | 2             | 1           | D    |
| ABD       | 3             | 0           |      |
| ABDE      | 3             | 1           | E    |
| ABDF      | 3             | 1           | F    |
| BBDF      | 0             | 4           | BBDF |

*FIG. 4C*

B-TREE EXAMPLE PAGE 460

| HEADER | NEXT PAGE=0 | RELATION | INDEX | DATA LENGTH=125 |
|---|---|---|---|---|
| LEVEL=0 | 9:0,3,ANN | 2:0,5,BRIAN | | 7:0,7,CHARLIE |
| 1:0,4,DAVE | 11:4,0,0 | 4:1,3,EB | 10:0,4,JOHN | 6:0,4,MARK |
| 8:0,5,PETER | 5:0,7,RICHARD | 3:0,5,SARAH | | -2:0,0,0 |
| -1:0,0,0 | | | | |

DATABASE SYSTEM WITH METHODOLOGY FOR NOTIFYING CLIENTS OF ANY ADDITIONS, DELETIONS, OR MODIFICATIONS OCCURRING AT THE DATABASE SERVER WHICH AFFECT VALIDITY OF A RANGE OF DATA RECORDS CACHED IN LOCAL MEMORY BUFFERS OF CLIENTS

The present application is a continuation-in-part of application Ser. No. 08/506,944, filed Jul. 26, 1995, which is now allowed, the disclosure of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to information access in a data processing system, such as a Database Management System (DBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee like name, home address, salary, and the like.

Between the actual physical database itself (i.e., the data actually stored on a storage device) and the users of the system, a database management system or DBMS is provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

DBMS systems have long since moved from a centralized mainframe environment to a de-centralized or distributed desktop environment—appearing as Personal Computer Database Management Systems (PC DBMS) on the desktops of most (PC) users. Common examples of PC DBMSs include Borland's dBASE® and Paradox®. More recently, PC DBMS systems have been connected via a network to a server-based database system (SQL database server) to form a client/server database system, such as connecting dBASE® clients to an Interbase® database server. As the migration to client/server continues, more and more PC end users are connected to served-based SQL database systems each day.

This has created a problem, however. Users of PC DBMS have come to expect certain navigational functionality from a database system. Specifically, users expect bidirectional scrolling, such as is common during a "browse" mode of operation. Additionally, users expect to be able to jump to a particular location in the database file, the location being specified either as an offset or as a particular record number. Examples of the latter include the dBASE commands of GOTO TOP, GOTO BOTTOM, and GOTO RECNO( ). All told, there are certain lower-level "verbs" which users expect when using a database system on the desktop.

Although the task of providing such functionality for a record-based or navigational database system is fairly straightforward, the task becomes problematic when attempted in an SQL-based database server environment. In particular, SQL databases are set-oriented; they have no notion of physical record locations, such as record numbers and record offsets. When the client attaches to a database via a SQL driver, the server has no context information such as the current index or the current position within the index. Thus, the client must maintain all this information, generating requests to change the current record.

How SQL-oriented systems try to address the problem is to emulate the desired action on the client side using clever caching mechanisms and issuing one or more SQL queries. Consider, for instance, a user request to scroll backwards through a group of records. This request would be satisfied by a system issuing a SQL query specifying a sort, in descending order, on a particular field. The database server, in response to such SQL commands, would provide the client with an answer set (i.e., copy of records satisfying the SQL query). The client then scrolls forward through the answer set, but, since it is sorted in descending order, it appears to the client user that he or she is scrolling backwards through the records. There are inherent drawbacks to this strategy, though. The strategy fails when the user traverses off the end of the cache. Also, the cached records will not be up-to-date with the current value on the server. A similar disadvantage occurs when a PC client requests a particular record order (i.e., set order to a particular index). Since SQL servers are set-oriented, the operation of setting to an index requires throwing away all current requests, looking up the new index, and emulating traversal on that index by sorting on the columns of the index.

Although an emulation approach is workable, it incurs a substantial performance penalty for the database system. For instance, the client must generate an appropriate SQL query which the database server, in turn, must parse and process. Further, as part of the approach, the server must perform a sort—a task which consumes substantial resources for the large database tables which are typically employed in corporate settings. Moreover, as a PC database user typically employs one or more indexes for specifying a sort order for the database, the client must take into account these indexes when specifying the descending sort.

The SQL set-oriented model is inadequate for handling the navigational model of database access common to PC databases. What is needed are systems and methods which provide the convenience and familiarity users associate with navigational databases, yet provide that in the context of an SQL database environment. The present invention fulfills this and other needs.

SUMMARY OF THE INVENTION

The present invention comprises a database system with methods for integrating the navigational semantic model of PC DBMS environments into the set-oriented model of SQL database environments. In particular, the present invention includes a Client/Server system which provides native navigational support on the server side of the system, without emulation of navigation through a multitude of SQL commands from the client.

In an exemplary embodiment, the system includes a client (e.g., PC workstation) connected to a server, via a network. In a preferred embodiment, the client communicates with an SQL database resident on the server via an SQL interface (e.g., database API) and SQL link (i.e., SQL driver). To provide native navigational support, the SQL-based database server is modified. Specifically, the functionality of the database engine underlying the SQL database server is extended to include direct support for navigational "verbs." The engine, in turn, includes handlers corresponding to each verb, for providing necessary functionality for achieving native navigational support. However, providing native navigational support at the engine alone is not sufficient for achieving full navigational support (e.g., scrollable cursors).

Other modules of the server are modified for achieving navigational support. The basic indexes which support logical views of the server's relational database tables are modified to support navigational capability. Still further, new index traversal methods are created for processing the modified indexes. The indexes themselves are modified so that the database server can navigate both forward and backward within the index structures (i.e., B-trees) themselves. This task is complicated since index key values are stored in prefix-compressed format.

The indexes are modified so that the Database Server can navigate both forward and backward within a particular leaf-level page of the B-tree indexes themselves. Specifically, each B-tree leaf pages, upon expansion into a corresponding expanded leaf page, stores not only uncompressed key values but also the length of the prior key ($L_1$) and the length of the current key ($L_2$). This allows the system to go forward to the next node or backward to the previous node, even though the key values at the nodes are prefix compressed. The lengths may be expressed in terms of relative (or even absolute) offsets. The expanded pages themselves are maintained in a buffer cache, which is located (conceptually) between the Database Server and the database table. When a page is expanded, therefore, it is assumed that it will be needed again (i.e., by the current process or by another process). When navigating back and forth in an index, the system can utilize a previously-expanded page, so long as another process is not updating that specific page. When the original B-tree page is updated, the expanded page is released (i.e., freed from memory).

Further, each of the leaf pages stores the amount of prefix compression for the page so that the memory buffer required for expansion of that page is known before the actual expansion (i.e., into an expanded index page) is performed. Since the memory buffer required for holding the largest "theoretical" index page which has expanded can be quite large, on the order of 100 megabytes or more, the system maintains a running count of expanded (uncompressed) space required by each node. As a new node is added, the running count is updated accordingly. In this manner, pages can be expanded in an efficient manner.

The indexes are further modified so that the Database Server can navigate both forward and backward between leaf-level pages of the B-tree indexes. The leaf pages are modified to add, in addition to forward page links, backward page links. Each leaf page on disk stores two page numbers: one pointing forward and another pointing backward. Thus, each page stores a page pointer or ID for identifying both the previous and the next (logical) page (i.e., in chain of pages). The pages themselves need not be stored contiguously on disk. Instead, the system, using the page identifiers or numbers stored on disk, loads relevant pages on an "as needed" basis.

The root page stores page numbers so that the root page stores key/page number combinations. Thus, the root page resembles the leaf pages in that it stores key values which are prefix compressed; instead of storing record numbers, however, the root page stores page numbers. The page numbers, in turn, refer to the pages as they are stored on disk. To access page number 101, for instance, the system would seek to a location which is the value of the page number (e.g., 101) multiplied by the size of the page (e.g., 1024 bytes). The page numbers, therefore, refer to offsets within the particular file set which comprises a single logical file (which may be made up of one or more physical files).

Besides modifying indexes, the system also modifies the "handoff" of pages, when traversing from one page to another. The task of navigation is complicated since the conventional scheme of a locked "handoff" for traversing from one page to another cannot be employed at the same time in reverse: such an approach would result in deadlocks. Left-to-right interpage navigation may be done in a conventional manner, by using a locked handoff. The right-to-left navigation cannot be done in the same conventional manner, however, as deadlocks will result.

A fault-tolerant method for traversing prior pages (i.e., right-to-left traversal), yet avoiding deadlocks, is as follows. The current page is released and the system proceeds to the previous page. Once at the previous page, the system checks whether that page's forward pointer points to the page which was just left. If the two are not identical, the system reads the forward pointer of the then-current page and then traverses to the right. It continues this rightward traversal until it reaches the page which it originally departed from. Once there, the system repeats the process of going left until it reaches a page whose forward pointer agrees with the page which was just departed from. Instead of handing off, therefore, the system just assumes at the outset that the new page is correct. That assumption is then verified to confirm that the new page's forward pointer agrees with the page number of the page which was departed from. If the validation does not hold true, the system steps rights until it returns to the original page, whereupon it repeats the process until a new page is found whose forward pointer agrees with the page number of the original page. Other methods are described for natural order navigation, setting "bookmarks," and retrieving records by "record number."

In an alternative embodiment, the present invention provides a "cache range" to clients so that clients can be assured that their local copies of data are up-to-date. When one or more records in a cache range change, the server sends a notification that the cache range has changed. In a preferred embodiment, the server of the present invention includes an event alerter mechanism; a mechanism for alerting clients of the occurrence of particular events which are of interest to the clients. The event alerter allows the client to avoid polling the server and refetching data at a given interval.

Employing an event alerter-based cache range, the foregoing client/server approach to updating records can be reversed as follows. Instead of the client taking a lock out for updating a record, the client simply indicates to the server which records it is interested in (e.g., via registering an event alerter request), whereupon the server manages its resources as necessary to notify the client of a change in one of the records which is of interest to the client. In effect, instead of a client/server approach to updating records, a server/client approach is adopted.

The client indicates to the server which record it is interested in when the initial request for the records is made. Thus at the time of submitting this request, the client can simply also indicate in the same request that these are records which the client desires to know if any changes are posted. Accordingly, the server can simply take out "interest" locks on the corresponding records; these are not locks which exclude the resource from other clients. Other clients are not prevented from accessing this resource (i.e., the records which are of interest). Instead, each interest lock serves as a latch which holds onto a record until another client indicates an interest, whereupon the latch is released (so that it does not prevent concurrent use of that object). In this manner, the interest lock can be employed to notify a client that a record is in use by another client. The lock does not, however, prevent concurrent access to that record. The interest lock is employed in conjunction with the registered event alerter for notifying the client that the record or records of interest are now in use by another client. In this manner, the server undertakes action to indicate to the client when the client local buffer might be stale.

BRIEF DESCRIPTION OF THE DRAWINGS

FIGS. 3A–B are block diagrams illustrating how a client/server system may be modified, in accordance with the present invention, for providing scrollable cursors.

FIG. 4C is a diagram illustrating use of prefix compression for storing key values.

FIG. 4D is a block diagram illustrating a simple B-tree index page, one having a single level, in the system of the present invention.

FIGS. 9A–B are block diagrams illustrating a problem which exists in client/server environments when a client displays a large number of records, such as in a "browse" mode, in the face of other updating clients.

DETAILED DESCRIPTION OF A PREFERRED EMBODIMENT

The following description will focus on the presently preferred embodiment of the present invention, which is operative in the Microsoft® Windows environment operating PC DBMS clients connected to SQL-based server(s). The present invention, however, is not limited to any particular one application or any particular windows environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms, including Macintosh, UNIX, NeXTSTEP, and the like. Therefore, the description of the exemplary embodiments which follows is for purposes of illustration and not limitation.

System Hardware

Figure 1A:
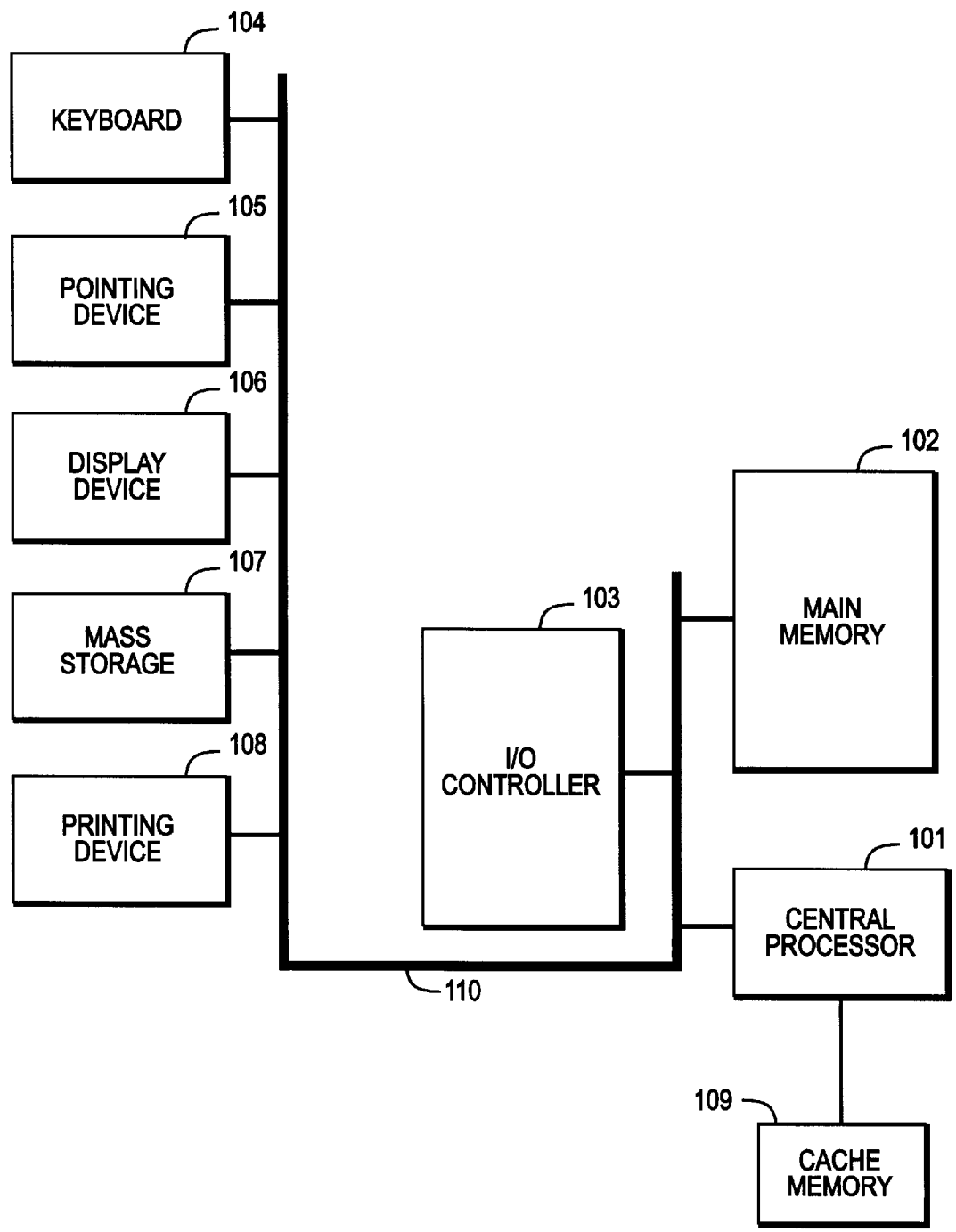
FIG. 1A is a block diagram of a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a display device 106, and a mass storage 107 (e.g., hard or fixed disk, optical disk, magneto-optical disk, or flash memory). Processor 101 includes or is coupled to a cache memory 109 for storing frequently accessed information; memory 109 may be an on-chip cache or external cache (as shown). Additional input/output devices, such as a printing device 108, may be included in the system 100, as desired. As shown, the various components of the system 100 communicate through a system bus 110 or similar architecture. In a preferred embodiment, the system 100 is an IBM-compatible personal computer system, available from a variety of vendors (including IBM of Armonk, N.Y.).

System Software

Figure 1B:
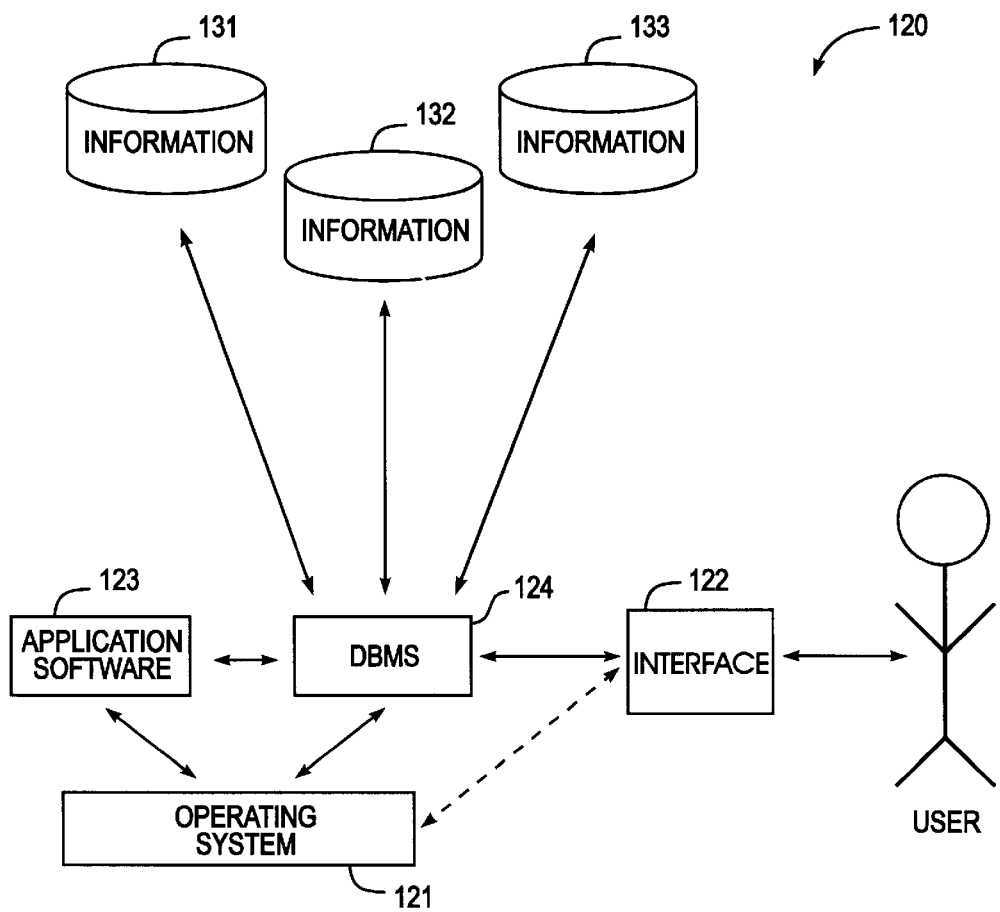
FIG. 1B is a block diagram of a computer software system for programming the operation of the computer system of FIG. 1A.

Illustrated in FIG. 1B, a computer software system 120 is provided for programming the operation of the computer system 100. Software system 120, which is stored in system memory 102 and on disk memory 107, includes a kernel or operating system 121 and a DBMS 124. OS 121 is the executive or supervisor for the system 100, directing both task management and data management.

Illustrated in FIG. 1B, a computer software system 150 is provided for directing the operation of the computer system 100. Software system 150, which is stored in system memory 102 and on disk memory 107, includes a kernel or operating system (OS) 140 and a windows shell 145. One or more application programs, such as application software 125 or one or more windows application software 151, 153, 155, may be "loaded" (i.e., transferred from storage 107 into memory 102) for execution by the system 100. As shown, windows application software includes a Relational Database Management System (RDBMS) 155 of the present invention.

System 150 includes a user interface (UI) 160, preferably a Graphical User Interface (GUI), for receiving user commands and data. These inputs, in turn, may be acted upon by the system 100 in accordance with instructions from operating module 140, windows 145, and/or application modules 125, 151, 153, 155. The UI 160 also serves to display the results of operation from the OS 140, windows 145, and applications 125, 151, 153, 155, whereupon the user may supply additional inputs or terminate the session. Although shown conceptually as a separate module, the UI is typically provided by interaction of the application modules with the windows shell, both operating under OS 140.

In a preferred embodiment, OS 140 is MS-DOS operating system software running Microsoft Windows; both are available from Microsoft of Redmond, Wash. The general methodology for creating windows-based applications is known in the art; see, e.g., Petzold, C., *Programming Windows*, Second Edition, Microsoft Press, 1990. Additional information can be found in Microsoft's Window Software Development Kit, including: 1) *Guide to Programming*, 2) *Reference*, Vols. 1 and 2, and 3) *Tools*, all available from Microsoft Corp. of Redmond, Wash. The disclosures of each of the foregoing are hereby incorporated by reference.

DBMS 124, on the other hand, is a software subsystem for storing, retrieving, and manipulating information in database tables (e.g., tables 131, 132, 133). Under the command of DBMS 124, the system 100 receives user commands and data through user interface 122. Interface 122 may include a built-in query surface or editor for accessing and processing database information. Additional application programs, such as DBMS application software 123, may be "loaded" (i.e., transferred from storage 107 into memory 102) for execution by the system 100, particularly for further controlling the operation of DBMS 124. DBMS 124 includes Paradox® for Windows Database Management System (available from Borland International of Scotts Valley, Calif.) operating in a shared environment, such as in a client/server configuration running in a Local Area Network (LAN) environment (described hereinbelow with reference to FIG. 1D). If desired, other operating systems and/or DBMSs (or alternative configurations thereof) may be employed in accordance with the principles of the present invention.

Figure 1C:
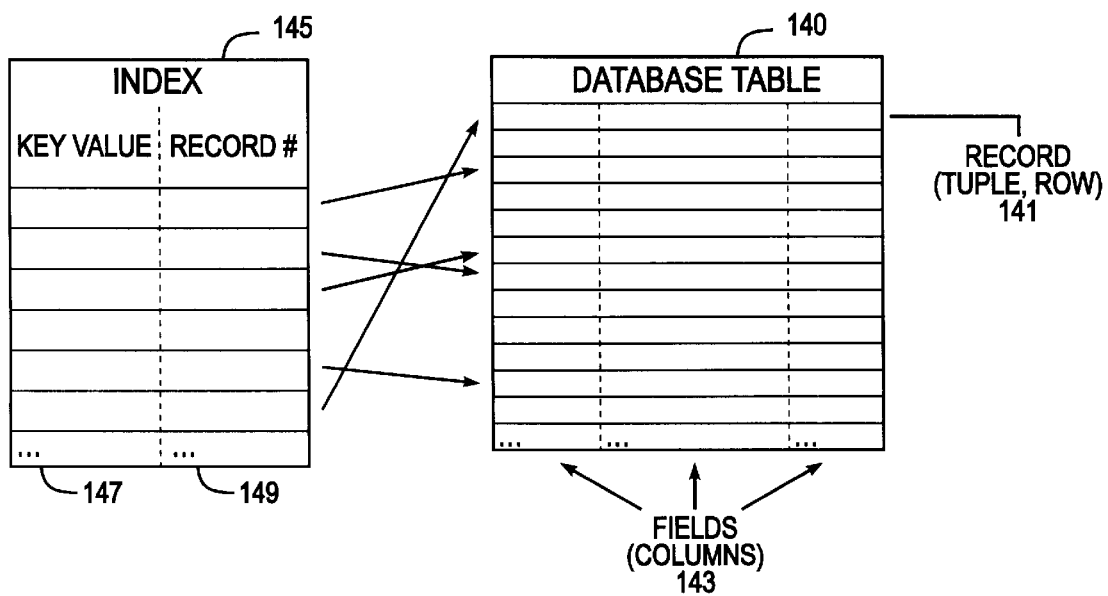
FIG. 1C is a block diagram illustrating the relationship between a database table and its index.

At the outset, it is helpful to understand general techniques for storing information, such as in DBMS 124. In a database management system, information is conveniently organized into tables, such as table 140 of FIG. 1C. As conceptually shown, table 140 typically includes horizontal rows or records (tuples) 141 and vertical columns or fields 143. A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

A given table may be interrelated to other data objects, including, for example, index, report, and form files. A database index allows the records of a table to be organized in many different ways, depending on a particular user's needs. As shown by index 145 of FIG. 1C, for example, an index may be constructed as a single disk file which is referred to internally by the system for locating and displaying records in a database file. Index 145 stores index key values 147 and unique record numbers 149. The former is a data quantity composed of one or more fields from a record used to arrange (logically) the database file records by some desired order (index expression); the latter are unique pointers to the actual storage location of each record in the database file.

Network Architecture

A. Network Hardware

Figure 1D:
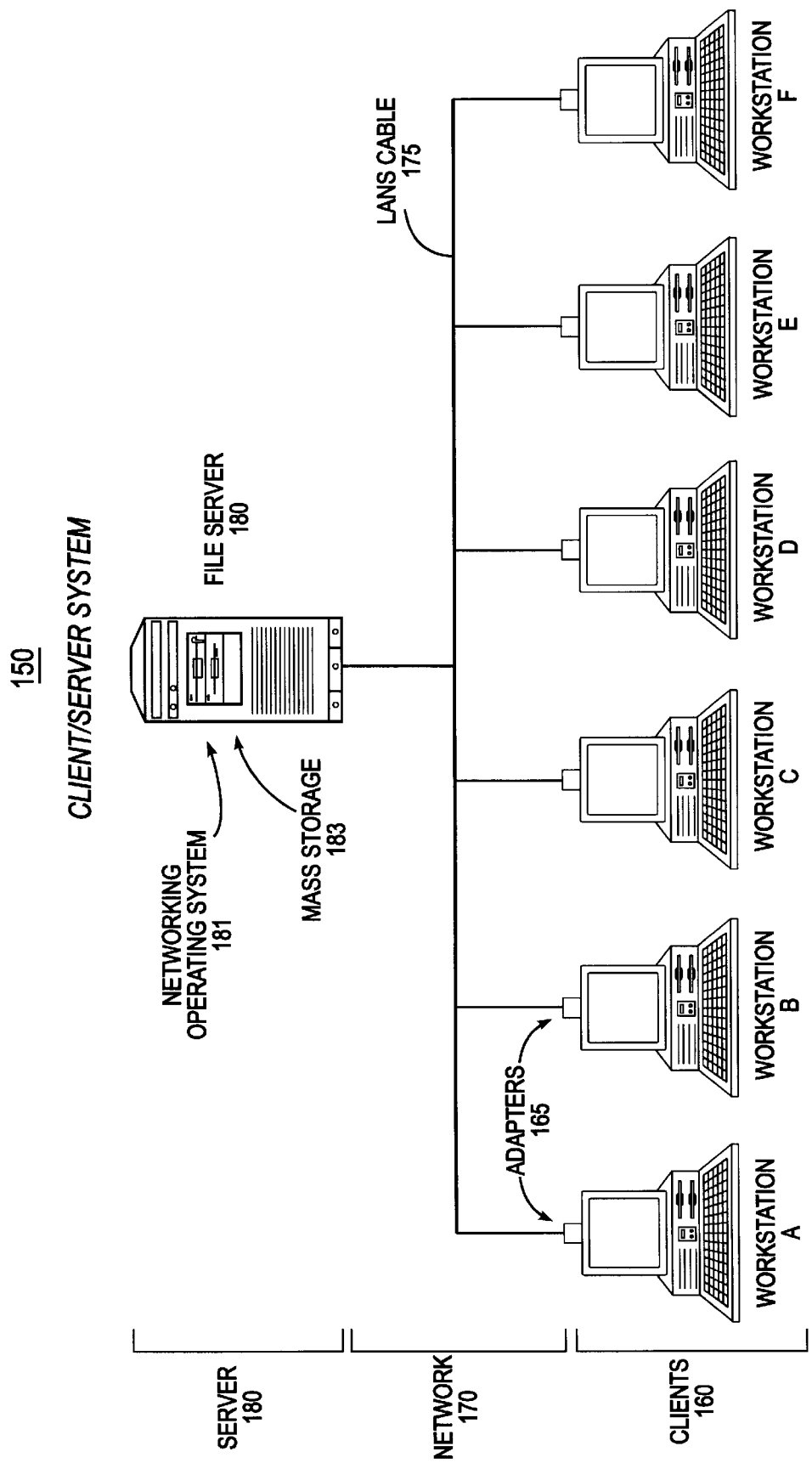
FIG. 1D is a block diagram of a client/server system configuration which may be employed for embodying the present invention in a Local Area Network (LAN) environment.

While the present invention may operate within a single (standalone) computer (e.g., system 100 of FIG. 1A), the present invention is preferably embodied in a multi-user computer system, such as the Client/Server system 150 of FIG. 1D which includes system 100. Specifically, system 150 includes a first computer or Server 180 and one or more second computers or Clients 160. In an exemplary embodiment, the Clients or workstations 160 are connected to Server 180 through a computer network 170, which may be a conventional Local Area Network (LAN). Network 170 includes cabling or network links 175 for connecting the Server and each workstation to the network. The workstations themselves will be similar to or the same as system 100; additionally, each typically includes an adapter 165 for receiving the network cable 175. Server 180 may also be similar to or the same as system 100. Because the Server manages multiple resources and objects for the clients, it should preferably include a relatively faster processor, larger mass storage, and more system memory than is found on each workstation.

Overall operation of the system 150 is directed by a networking operating system 181, which may be stored in the Server's system memory; in a preferred embodiment, OS 181 includes NetWare®, available from Novell of Provo, Utah. In response to requests from the Clients 160, the Server 180 provides various network resources and services. For instance, multiple users (e.g., workstations A, B, and C) may view a database table stored in file Server storage 183, while another user (e.g., workstation E) sends a document to a network printer (not shown).

The general construction and operation of a computer network has been well documented in the technical, trade, and patent literature. For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, Utah. For a discussion of a computer network employing Microsoft Networks/OpenNet File Sharing Protocol, see Method and System for Opportunistic Locking in a Netwoked Computer System, Intl. Application No. PCT/US90/04570, Intl. Publication No. WO 91/03024, Intl. Publication Date Mar. 7, 1991. The disclosures of each of the foregoing is hereby incorporated by reference.

B. Client/Server Database Management System

Figure 2:
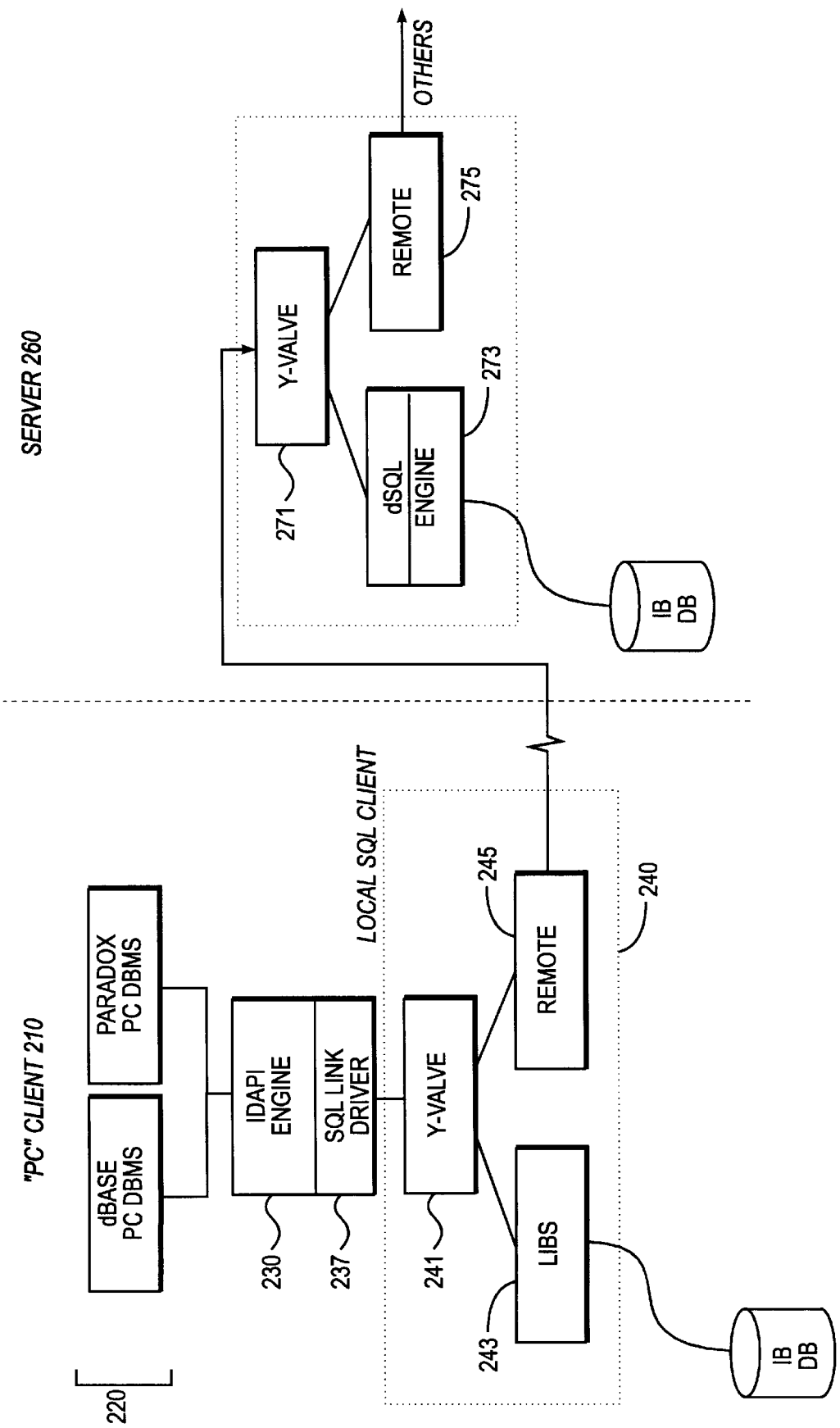
FIG. 2 is a block diagram illustrating a Client/Server Database Management System of the present invention.

FIG. 2 is a block diagram providing an overview of the Client/Server Database Management System 200 which includes a Client (e.g., PC workstation) 210 connected via a Network 250 to a Server 260. The Client 210 comprises a database frontend (e.g., dBASE or Paradox). The Client 220 is, in turn, connected to a Database Local Engine 230 via an Interface Layer 235 (which is generally a database API layer). The Local Engine 230 then connects to an SQL database via an SQL Link 237. In an exemplary embodiment, the Database Frontend 220 may be dBASE or Paradox, the Database Engine 230 may be Borland Database Engine, the Interface Layer 235 may be IDAPI, and the SQL Link 237 may be Borland SQL Link. All of the foregoing are available from Borland International of Scotts Valley, Calif.

Those skilled in the art will appreciate, however, components from other vendors may be applied in accordance with the present invention. For instance, the Client 220 may include Microsoft Access or Microsoft FoxPro. Similarly, the Database Engine 230 may include the Microsoft Jet Engine, with the Interface Layer being the Jet API. In such an embodiment, the SQL Link Layer 237 would typically include ODBC (Open Database Connectivity, available from Microsoft).

SQL Link Layer 237, in turn, connects to a local SQL Client 240. In an exemplary embodiment, the SQL Local Client comprises the Local Interface Engine, available from Borland International. In such an embodiment, the local SQL Client 240 includes a Y Valve 241, a Local SQL Server 243, and a Remote Interface 245. In an exemplary embodiment, the Local SQL Server comprises Borland's Local Interbase Server (LIBS), available from Borland International.

The Local Server 243 and the Remote Interface 245 surface essentially identical SQL database APIS. The Y Valve 241, therefore, functions to determine whether a particular SQL call coming in from the SQL Link Module 237 is serviced locally (by the Local Server 243), or remotely via the Remote Interface 245 (which in turn will call on to the SQL Database Server residing on the Server 260). In other words, a call into the Y Valve 241 is routed either locally (to Server 243) or remotely (to Interface 245). The Remote Interface 245 includes functionality for packaging the SQL call and its parameters into a format (of one or more packets) suitable for transmission across the Network 256, for delivery to the Server 250.

As shown in the figure, the call or request is passed on to the Network 256 from the Remote Interface 245 and arrives at the Server 250 specifically at a second Y Valve, shown as Y Valve 271. The Y Valve 271, in turn, makes the same decision as the first Y Valve: whether to handle the request locally (to its Server) or route the call to another Server, via Remote 275. If the Y Valve 271 routes the call locally (i.e., local to Server 260), then the call is passed onto the SQL Database Engine 273. The SQL Engine 273 may be similar to or the same as Local Server 243. In a preferred embodiment (specifically using Interbase), the Engine 273 is a version of Server 243 running under Windows NT or UNIX. In effect, the two engines are the same; however, each generally runs under a different operating system (e.g., such as the Client Database 243 running under a Client Operating System and the Engine 273 running under a Server Operating System).

As shown in FIG. 2, this scheme may continue on to yet another server, chained to as many additional servers as desired. In essence, the Client has a "virtual" view of the data. In other words, the Client submits an SQL command for operation on particular data, without having any concern about where the particular data actually resides. The data may, for instance, reside on a server five or more Y-Valve levels out. The propagation of data is handled in a manner which is transparent to the user.

Navigation access in a SQL-based database server system

A. Overview

The SQL Server surfaces a number of verbs to the local engine (i.e., Engine 230). Before describing this, however, it is helpful to further examine the interface between the SQL Engine (e.g., 273) and the Local Client/Engine (e.g., 230). In operation, the SQL Engine manifests a number of API calls, which are entry points to the functions or subroutines of the SQL Engine. To invoke a particular function, therefore, the Local Engine 230 makes "calls" into the SQL Engine (e.g., SQL Link Driver 237). In response to such calls, the SQL Engine generally performs one or more tasks and, depending on the particular operation, returns a result back to the Client Engine 230.

B. Low-Level Calls from the Client to the Server

In a preferred embodiment of the present invention, driver access to a SQL database engine is not SQL-based. It is, instead, a lower-level access using a lower-level data access language of BLR—Binary Language Representation (available with InterBase, from Borland International of Scotts Valley, Calif.). In this manner, the driver can generate a single request to handle navigational semantics. Thus, the semantic model is not emulated; the Server maintains the context information required to traverse the table and reset the current index.

Of particular interest to the present invention is the following API call: isc_compile_request (blr_string). This particular call represents a low-level link to the SQL Engine. The blr_string (Binary Language Representation string) itself is a byte-encoded string, representing a series of opcodes. It is the native language of the engine itself. This allows requests to be generated by the driver which are capable of going forward and backward through a table, setting a current index, finding a record by key value, updating a record, and the like. In short, the request is capable of doing all the operations supported by the navigational interface, yet does not require recompilation.

The request itself may be thought of as a large case statement. Once the request is sent to the Server, the driver communicates with the running request via messages. Each message type corresponds to an operation in the Client or local engine, so that the Server is kept apprised of the end user's current state. The Server itself performs the operation on behalf of the Client, rather than the driver emulating the operation. The request will branch and perform various actions based on the state information passed to it and, thus, may be large. Generally, few requests are generated to compile. Since more state information is passed to the request rather than compiled into it, it does not have to be recompiled often.

A blr string actually forms a small self-contained program, such as the following:

```
blr_begin
    blr_message
    ...
    blr_loop
    blr_assign
blr_eoc
```

As shown, it includes variable declarations, assignments, loop constructs, block delimiters (e.g., begin and end), messages, and the like. The "messages" defined within the blr_string are the messages passed back and forth, between the Client and the Server. A blr_string defines one or more actions to be carried out at the Server (e.g., conditional logic). Since the blr_string already represents the low-level native language of the Server, the Server may map it (i.e., compile it) into a parse tree structure suitable for conversion into machine language instructions (for the target processor). In other words, the string is compiled into a tree which the SQL Engine knows how to execute. In a preferred embodiment, using Interbase from Borland, the Engine itself is structured as a series of actual machine instructions (conceptually) arranged as a large switch or case statement, for execution upon receipt of a particular node of the parse tree.

Particular blr low-level verbs are added to the system. For instance, the navigational command of "SEEK" (corresponding, for example, to the dBASE command of SEEK), is implemented as a blr_seek command. This will now be examined in further detail.

C. Providing navigational capability to a set-oriented (SQL) database server

According to the present invention, the database Server allows the Client to define a navigational string. Since the Server supports the underlying navigational semantics of the Client, no semantic mapping is necessary. In an exemplary embodiment, the following navigational capabilities are supported: Set current index or set to natural order; go to next record; go to previous record; seek forward or backward a specified number of records; go to the beginning or end of the table; search for a key value, including a partial key; and find a particular record in a navigational stream. The following describes the BLR to perform these operations.

(1) BLR Streams

To support navigational semantics, a stream expression is introduced. This expression is similar to a record selection expression (RSE) used by SQL-type requests. Only a subset of the capabilities is supported, in order to reduce the amount of error checking needed. The stream expression is used to specify a single table to use in retrieving records. The "blr_stream" construct is a limited version of "blr_rse," in that joins, sorts and aggregates are not permitted.

The syntax for the blr_stream expression is:

```
blr_stream { blr_relation relation_name | blr_rid id } stream
    [boolean-expression]
    blr_end
```

Stream numbers used in blr_stream and blr_rse expressions are unique. The boolean-expression is a restriction on the records that will be retrieved. Its syntax is identical to the boolean-expression for the blr_rse expression, and it is used to implement filters and other restrictions on records in a navigational stream.

(2) Current Index

By default, navigation on a stream is done in natural order. The request may change that order dynamically by resetting the current index. This is done with the following syntax:

```
blr_set_index stream
    [index-id]
``` where stream refers to a previously declared blr_stream number, and index-id is a value expression evaluating to the index ID to use. All subsequent seeks on this stream are done with respect to this index. An index-id of 0 indicates that the index should be reset to natural order.

(3) Seeking Through a Stream

To move through an RSE, the blr_for construct is used to automatically loop forward through the records. The blr_stream statement is used to declare a stream anywhere within the request (provided it is declared before it is referenced). The new statement "blr_seek" is used to move forward and backward through the stream. The syntax for the seek statement is:

blr_seek stream direction offset where stream refers to a blr_stream number, offset is an expression evaluating to an unsigned long, and direction is a single byte indicating: (1) blr_forward: move offset records forward from the current record; (2) blr_backward: move offset records backward from the current record; (3) blr_bof_forward: start at the beginning of the stream and move forward offset records; and (4) blr_eof_backward: start at the end of the stream and move backward offset records.

(4) Finding a Key Value

The statement "blr_find" sets the current record in a stream to a record of a given key value. The syntax for the find statement is:

```
blr_find stream operator backwards arg_count
    value-expression1, . . . , value-expressionN
``` where stream is defined as a previous blr_stream number and operator is one of the following values: blr_lss, blr_leq, blr_eq, blr_geq, blr_gtr. These indicate the comparison operation to perform on the record stream. For example, if a "blr_geq" is specified, the Server will find the first record whose key value is greater than or equal to the specified key. The backwards argument is a byte of value 0 to indicate that the search direction is forwards, or value 1 to indicate that the search direction is backwards; arg_count is a count of the number of value-expressions to follow, where value-expression is compared with a single segment of the key in the current index. The value-expression may be a partial key operation, such as searching for last name on an index defined on last name, first name, in which case arg_count is less than the actual number of keys in the index.

(5) Finding a Record

To find a particular record when the dbkey is known, the following statement was added:

blr_find_dbkey stream dbkey where stream is a previously defined stream number, and dbkey is an eight-byte quantity evaluating to a dbkey previously retrieved via the blr_dbkey expression. Whether the table is specified in indexed or natural order, the find_dbkey statement fetches the record specified by the dbkey, and sets the current position of the stream to the position of that record. Whether the stream was set to the same index when the dbkey was fetched is not important.

Internal operation

A. Scrollable cursors

FIGS. 3A and 3B are block diagrams contrasting the approach of the present invention for providing scrollable cursors (FIG. 3B) with a conventional approach (FIG. 3A). In FIG. 3A, the Client 310, which is connected to a Database Server 350 via a network, emulates the scrolling locally, by using a multitude of SQL commands together with a local cache. There are numerous disadvantages to this approach. For one, issuing a large number of SQL commands greatly increases network traffic, thereby degrading the performance of the network. Moreover, the multitude of SQL commands places a tremendous burden on the Database Server 350, as it must expend precious resources parsing and processing each one of the many commands.

To make the approach of FIG. 3A function in real-time, a cache memory is required, for offsetting the otherwise poor performance of the arrangement. Employing a cache, particularly a large one, is not without difficulties, however. In particular, additional methods (and associated overhead) are required for maintaining concurrency between the records in the cache and corresponding records resident on the Database Server. In this regard, the cache is employed more for optimizing network I/O, instead of optimizing server load. As an additional disadvantage, a large cache further complicates the task of the client (i.e., specifically the local engine and SQL link or interface) in the instance of updated records. Since the copy of records in the cache may be stale, the client must undertake additional steps to ensure that a record which has been updated locally has not, in fact, already been changed at the server.

FIG. 3B is a block diagram illustrating modification of the System 300, now System 300*a*, in accordance with the present invention. As shown, the Client (now Client 310*a*) includes a driver which formulates a single BLR statement, instead of a multitude of SQL statements. Further, the Database Server (now Database Server 350*a*) is modified as follows. First, native navigational support is added to the Server, as shown at 351. In other words, the Server, which is ordinarily set-based, is "taught" navigational techniques.

In operation, the Database Server 350*a* receives the BLR statement from the Client. This is processed by the Server to generate a node tree of executable commands. The node tree is in turn executed by the Server, specifically by a looper routine using recursive descent methodology. The looper routine, which may be viewed as a large "switch" statement, is modified to provide direct navigational support. Looper includes, for example, case arms for seek, find, skip, and the like. In this regard, the looper routine functions as a dispatcher, and the navigational routines function as handlers. These handlers or routines perform their methodology in the context of a cursor. Each of these methods, in turn, "know about" the different way in which the system retrieves data (i.e., traverses indexes).

In an exemplary embodiment, the looper method may be constructed in the C programming language as follows.

```
 1:   static NOD looper (request, in_node)
 2:   {
 3:   /****************************************
 4:    *
 5:    *   looper
 6:    *
 7:    ****************************************
 8:    *
 9:    * Functional description
10:    *      Cycle thru request execution tree. Return next node for
11:    *      execution on stall or request complete.
12:    *
13:    ***************************************/
14:   STA    impure;
15:   NOD    *ptr, *end, handlers, node, top_node = NULL, prev_node;
16:   TRA    transaction;
17:
18:   // . . .
19:
20:   /*  This is the main execution loop in the engine; switch based
21:       on the current node type in the execution tree. */
22:
23:   while (node && !(request->req_flags & req_stall))
24:         }
25:         switch (node->nod_type)
26:         {
27:   // . . .
28:       case nod_stream:
29:           node = stream (node);
30:           break;
31:
32:       case nod_find:
33:           node = find (node);
34:           break;
35:
36:       case nod_find_dbkey:
37:       case nod_find_dbkey_version:
38:           node = find_dbkey (node);
39:           break;
40:
41:       case nod_set_index:
42:           node = set_index (node);
43:           break;
44:
45:           case nod_set_bookmark:
46:           node = set_bookmark (node);
47:           break;
48:
49:       case nod_release_bookmark:
50:           node = release_bookmark (node);
51:           break;
52:
53:       case nod_end_range:
54:           node = RNG_end (node);
```

```
-continued
55:          break;
56:
57:     case nod_delete_range:
58:          node = RNG_delete (node);
59:          break;
60:
61:     case nod_delete_ranges:
62:          if (request->req_operation == req_evaluate)
63:          {
64:          RNG_delete_ranges (request);
65:          request->req_operation = req_return;
66:          }
67:          node = node->nod_parent;
68:          break;
69:
70:     case nod_range_relation:
71:          node = RNG_add_relation (node);
72:          break;
73:
74:     case nod_release_lock:
75:          if (request->req_operation == req_evaluate)
76:          {
77:          desc = EVL_expr (node->nod_arg [e_rellock_lock]);
78:          RLCK_release_lock (*(LCK*) desc->dsc_address);
79:          request->req_operation = req_return;
80:          }
81:          node = node->nod_parent;
82:          break;
83:
84:     case nod_release_locks:
85:          if (request->req_operation == req_evaluate)
86:          {
87:          RLCK_release_locks (request->req_attachment);
88:          request->req_operation = req_return;
89:          }
90:          node = node->nod_parent;
91:          break;
92:
93:     case nod_force_crack:
94:          if (request->req_operation == req_evaluate)
95:          }
96:          RSE_MARK_CRACK (*(RSB*)node->nod_arg [1],rsb_crack|rsb_forced_crack);
97:          request->req_operation = req_return;
98:          }
99:          node = node->nod_parent;
100:         break;
101:
102:    case nod_reset_stream:
103:         if (request->req_operation == req_evaluate)
104:         }
105:         RSE_reset_position (*(RSB*) node->nod_arg [e_reset_from_rsb],
106:            request->req_rpb+(USHORT)node->nod_arg [e_reset_to_stream]);
107:         request->req_operation = req_return;
108:         }
109:         node = node->nod_parent;
110:         break;
111:
112:    default:
113:         BUGCHECK (168); /* action not yet implemented */
114:    }
115: }
116:
117: // . . .
118:
119: return node;
120: }
```

The above case arms show the processing associated with particular verbs. The nod_find (line 32) case arm finds a record based on a key value. The nod_find_dbkey (line 36) case arm, on the other hand, finds a record based on a dbkey. The nod_set_index (line 41) case arm "sets" a particular index, such as done in dBASE, for establishing a particular order of the table. Each of the nod_set_bookmark and nod_release_bookmark case arms (lines 45 and 49) sets and releases bookmarks, respectively. Finally, a nod_stream is what a BLR stream maps to; it opens a stream.

B. Modification of B-tree indexes

1. Overview

Providing native navigational support alone is not sufficient for creating scrollable cursors at the Server level. Instead, the basic indexes which support logical views of the Server's relational database tables must themselves be modified to support navigational capability. Moreover, new index traversal methods are required for processing the modified indexes. Before describing these in detail, it is first helpful to examine the detailed structure of indexes employed by the Database Server.

2. Index Structure

Figure 4A:
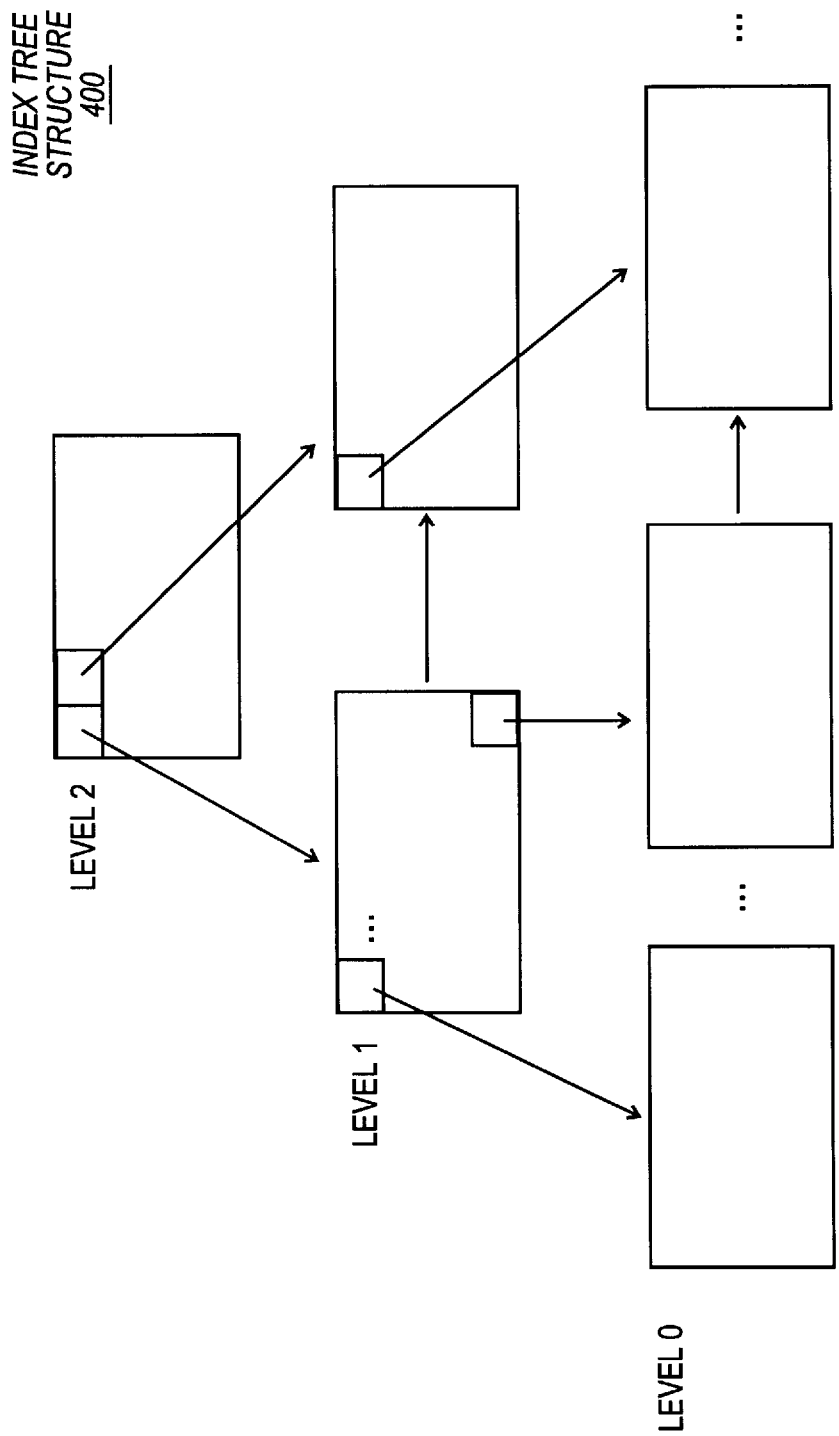
FIG. 4A is a block diagram illustrating an index organized as a B-tree data structure.

In the system of the present invention, an index is employed to store pointers to all the records in a relation (i.e., table), sorted on the fields for which the index is defined. As shown in FIG. 4A, an index is organized as a tree 400 of pages, collectively known as a B-tree. Trees are organized into levels, numbered from 0 at the lowest level and increasing towards the root of the tree. The tree 400, for example, is organized into three levels. Pages at levels 1 and higher contain pointers to pages at the next lower level. Each page has a sibling pointer which points to the next page in the same level.

Figure 4B:
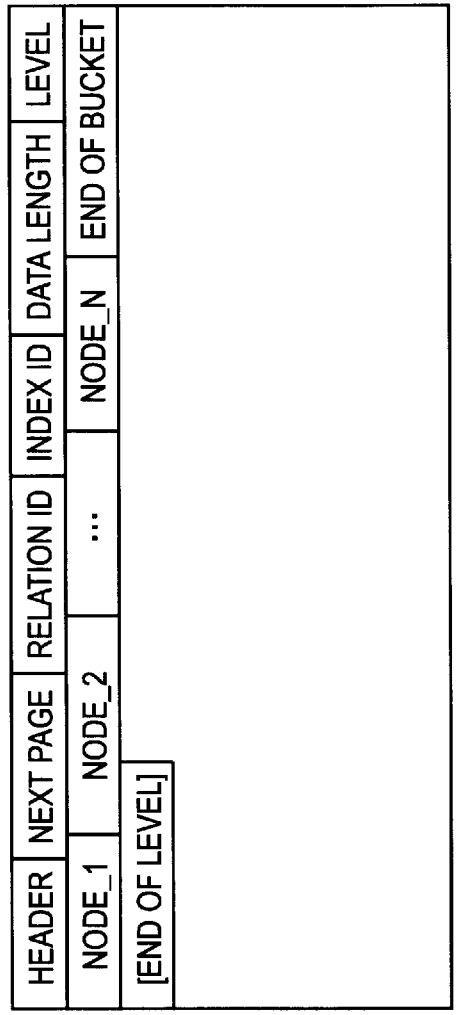
FIG. 4B is a block diagram illustrating a B-tree page layout employed in the system of the present invention.

As shown in FIG. 4B, a B-tree page layout, such as page layout 430, specifies that each page hold a variable number of variable-length nodes. The page is organized as follows.

(1) page header; flags for a B-tree page could be:
   page is first one in its level
   page has not been propagated to a higher level
   page is marked for deletion
   page is part of a descending index
(2) page number of the next B-tree page on the same level
(3) relation id; redundant info for consistency check
(4) index id; redundant info for consistency check
(5) length of data in the page
(6) level number of the page in the index, starting with 0 for the root page
(7) an array of leaf nodes (followed by end-of-page marker)
(8) total length of all the nodes (for ease in copying)

The end-of-page marker is used to mark the end of the array. In an exemplary embodiment, this is an empty node with the record number set to −2. In addition, an end-of-level marker is used to mark the end of the last page in the level. This is an array node with a record number of −1.

The B-tree nodes, which are stored within the B-tree pages, have the following format:

(1) record number or page number (pointer): points to record or B-tree page
(2) length of prefix: the number of bytes that the key value has in common with the previous record's key value
(3) length of data: the number of bytes left after the prefix
(4) data: the bytes remaining after the prefix Each B-tree node contains a pointer, either to a record or to another B-tree page. Nodes at level 0 are called leaf nodes; each contains a record number. Nodes at higher levels contain the page number of the B-tree page at the next level. The next three fields in the B-tree node describe the key value of a particular record. The key value is a concatenation of the values of the indexed fields for that record. Key values stored at levels 1 or higher contain the first key value stored on the lower level page, making it possible to step down the tree to find a particular record or range of records.

Key values are stored in the index using "prefix compression," which is illustrated by the prefix compression table 440 in FIG. 4C. Since nodes are arranged in sorted order, it is often the case that characters in common exist between successive key values (stored in previous nodes). Prefix compression takes advantage of these characters in common. Table 440 illustrates the approach for an index defined on a character field. Here, the leftmost column describes the value of the indexed field for the first few records in the index. The next three fields contain the values which are stored in the corresponding B-tree node. When a particular page is required at run time, it is read in from disk and "expanded" in system memory: its key values are dynamically expanded into their uncompressed state.

When an index is defined, during system operation, the records in the relation or table are sorted on the key field(s) of the index. For each record, the key value and the record number are both inserted in the index. At the outset, only one B-tree page in the index, with a level of 0, exists in the index. Nodes are added successively to the end of the page, using prefix compression to store the key values. When that page is filled, a sibling page is created at level 0. A new root page is allocated at level 1, which points to both level 0 pages. Subsequent records are then added to the sibling page. As new pages are created at level 0, they are added to the root page at level 1. When a level 1 page is filled, a sibling page is allocated. A new root page at level 2 is created, which points to both level 1 pages. The process continues up to a maximum number of levels (e.g., 16 levels). FIG. 4D illustrates a simple B-tree index page 460 with one level, defined on an EMPLOYEES relation.

3. B-Tree Modifications for Bi-directional Navigation

(a) Overview

Conventionally, SQL database systems only include methods for traversing forward through leaf-level pages of B-tree indexes. One reason that SQL database servers are limited to this forward traversal is that the key value information stored in the pages is compressed using the above-described prefix compression. Since each successive key value eliminates information in common with its predecessor key value, the task of traversing both within a leaf page and between leaf pages is complicated. One cannot simply pick a starting node and then traverse backwards. The actual key value stored at that point cannot be determined as the information in common with prior nodes is not known, since no previous nodes have been visited in this instance. In order to guarantee that one can read any node on the page, it may be necessary to go back to the very beginning of the page (or find the last node which is fully described).

Unlike B-tree indexes in a conventional SQL (i.e., set-oriented) database server, the indexes in the system of the present invention are modified to support bi-directional navigation through a cursor, including both intra-page and inter-page navigation. The former is traversing forward and backward within a leaf page; the latter is traversing forward and backward along the leaf pages. Each will be described in turn.

(b) Modification For Intra-Page Navigation

Figure 5:
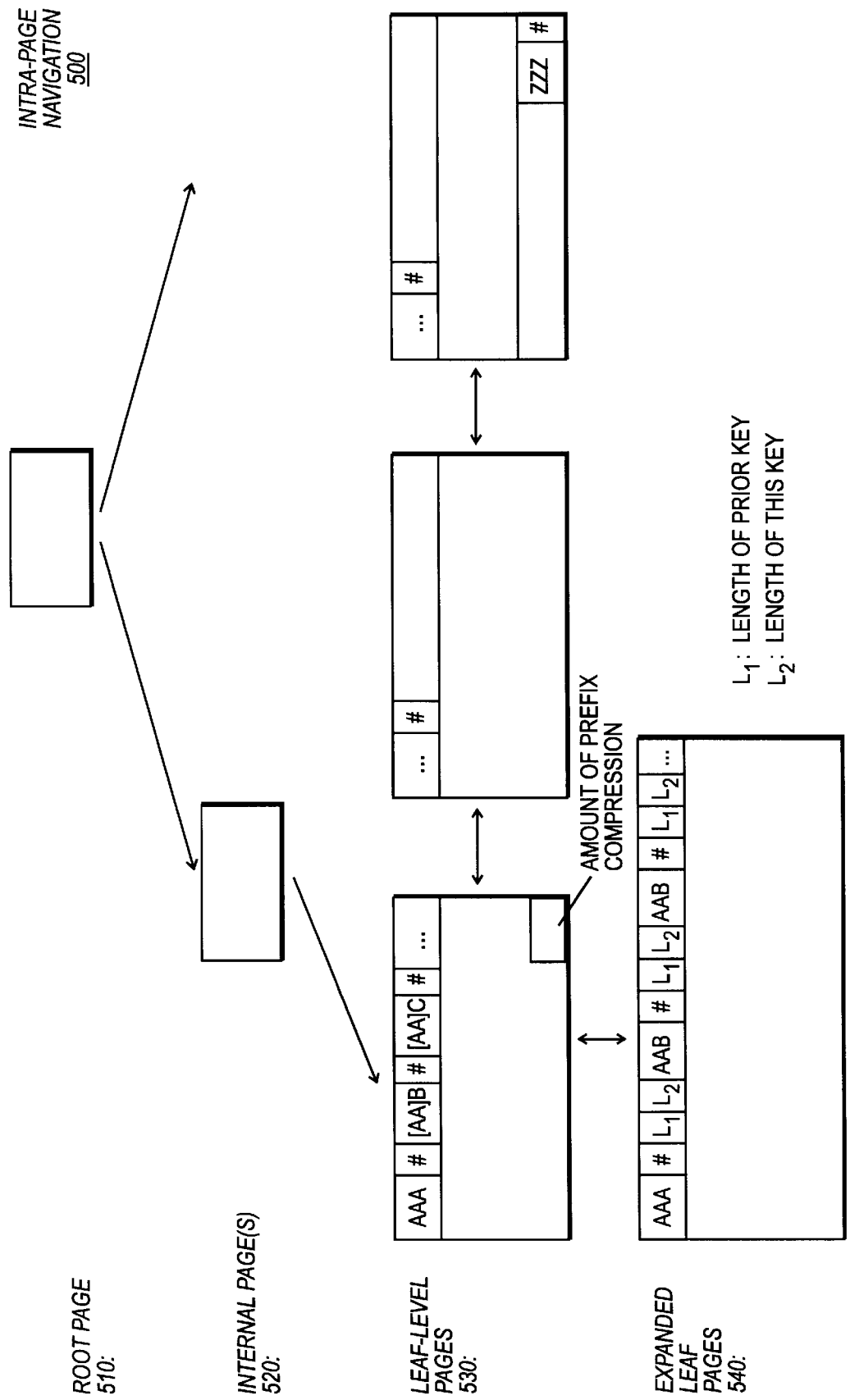
FIG. 5 is a block diagram illustrating intrapage navigation among leaf-level pages of a B-tree index in the system of the present invention.

The indexes are modified so that the Database Server can navigate both forward and backward within a particular leaf-level page of the B-tree indexes themselves. As shown in FIG. 5, each of the B-tree leaf pages 530, upon expansion into expanded leaf pages 540, stores not only uncompressed key values but also the length of the prior key ($L_1$) and the length of the current key ($L_2$). This allows the system to go forward to the next node or backward to the previous node, even though the key values at the nodes are prefix compressed. The lengths may be expressed in terms of relative (or even absolute) offsets. The expanded pages themselves are maintained in a buffer cache, which is located (conceptually) between the Database Server and the database table. When a page is expanded, therefore, it is assumed that it will be needed again (i.e., by the current process or by another process). When navigating back and forth in an index, the system can utilize a previously-expanded page, so long as another process is not updating that specific page. When the original B-tree page is updated, the expanded page is released (i.e., freed from memory).

Also shown in FIG. 5, each of the leaf pages 530 stores the amount of prefix compression for the page so that the memory buffer required for expansion of that page is known before the actual expansion (i.e., into an expanded index page) is performed. Since the memory buffer required for holding the largest "theoretical" index page which has expanded can be quite large, on the order of 100 megabytes or more, the system maintains a running count of expanded (uncompressed) space required by each node. As a new node is added, the running count is updated accordingly. In this manner, pages can be expanded in an efficient manner.

(c) Modification for Inter-Page Navigation

Figure 6:
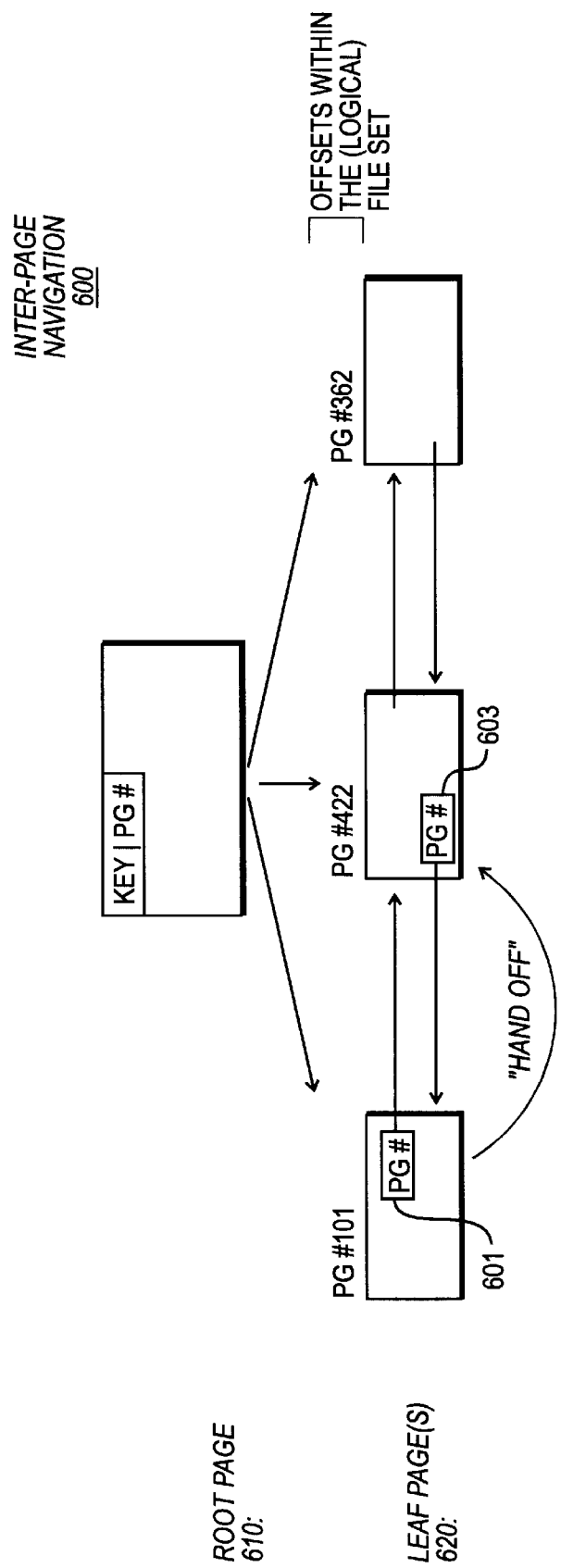
FIG. 6 is a block diagram illustrating interpage navigation among leaf-level pages of a B-tree index in the system of the present invention.

The indexes are further modified so that the Database Server can navigate both forward and backward between leaf-level pages of the B-tree indexes. FIG. 6 illustrates inter-page navigation 600 for a tree comprising a root page 610 and leaf page(s) 620. The leaf pages are modified to add, in addition to forward page links, backward page links. For the two-level index 600 in FIG. 6, each leaf page on disk stores two page numbers: one pointing forward (pointer 601) and another pointing backward (pointer 603). Thus, each page stores a page pointer or ID for identifying both the previous and the next (logical) page (i.e., in chain of pages). The pages themselves need not be stored contiguously on disk. Instead, the system, using the page identifiers or numbers stored on disk, loads relevant pages on an "as needed" basis.

Also shown, the root page 610 stores page numbers so that the root page stores key/page number combinations. Thus, the root page resembles the leaf pages in that it stores key values which are prefix compressed; instead of storing record numbers, however, the root page stores page numbers. The page numbers, in turn, refer to the pages as they are stored on disk. To access page number 101, for instance, the system would seek to a location which is the value of the page number (e.g., 101) multiplied by the size of the page (e.g., 1024 bytes). The page numbers, therefore, refer to offsets within the particular file set which comprises a single logical file (which may be made up of one or more physical files).

Besides adding bi-directional page pointers, the system also modifies the "handoff" of pages, when traversing from one page to another. Consider a scan of an index. Such an operation would occur, for instance, in the following SQL query:

SELECT*
FROM employees
ORDER BY emp#

Here, the emp# field represents the field which the table is indexed on.

The query would be implemented using the index, since it contains the result, already pre-sorted. Particularly, the query would be satisfied by scanning the emp# index: starting at the beginning of the index and traversing the sequence of leaf pages (as specified by the page pointers). The record numbers would be read from the nodes of the leaf pages and the corresponding records would be retrieved and returned to the user. When traversing the leaf pages, the currently-held leaf page is not released until the system successfully obtains a lock on the next leaf page. The process of locking the next page and releasing the previous page is the "handoff." This is required to ensure concurrency—that another process does not split a page while it is being viewed (i.e., by the current process). If a lock were not obtained on the next page before traversing, it is possible that the next page might be split, thereby generating a new page between the two pages (i.e., between the two pages which the current process is traversing). As part of concurrency control, therefore, pages are handed off in a left-to-right fashion.

Consider a query which scans the index in an ascending fashion executed simultaneously with a query which scans the index in a descending fashion. In such an instance, it is possible to trigger a "deadlock." A deadlock occurs when a first process (e.g., ascending scan) waits for a page locked by a second process (e.g., descending scan), which itself is waiting for a page locked by the first process. If no other precautions are undertaken, deadlocks will occur when pages are handed off not only from left-to-right, but also from right-to-left.

C. Navigation methods

1. Intrapage

Intrapage navigation is the process of moving among records on a single page. The workhorse for doing the intrapage navigation is a NAV_get_record function which, in an exemplary embodiment, may be constructed as follows (using C programming language):

```
 1:   BOOLEAN NAV_get_record (
 2:       RSB         rsb,
 3:       IRSB_NAV    impure,
 4:       RPB         *rpb,
 5:       RSE_GET_MODE direction)
 6:   {
 7:   /****************************************
 8:    *
 9:    *   NAV_get_record
10:    *
11:    ****************************************
12:    *
13:    * Functional description
14:    *   Get a record from a stream, either in
15:    *   the forward or backward direction, or the
16:    *   current record. This routine must set
17:    *   BOF, EOF, or CRACK properly.
```

```
18:    *
19:    ***************************************/
20:    IDX    *idx;
21:    IRB    retrieval;
22:    NOD    retrieval_node;
23:    BTR    page;
24:    BTN    node, next;
25:    EXP    expanded_page;
26:    BTX    expanded_node, expanded_next = NULL;
27:    WIN    window;
28:    SLONG    number;
29:    USHORT
30:    KEY key, upper, lower;
31:    UCHAR    *p, *q;
32:
33:    idx = (IDX*) ((SCHAR*) impure
34:        + (SLONG) rsb->rsb_arg [RSB_NAV_idx_offset]);
35:
36:        // . . .
37:
38:    /* find the last fetched position from the index */
39:    window.win_page = impure->irsb_nav_page;
40:    next =    get_position (rsb, impure, &window, direction,
41:                &expanded_next);
42:    MOVE_FAST    (impure->irsb nav data, key.key_data,
43:                impure->irsb_nav_length);
44:    retrieval_node
45:        =(NOD) rsb->rsb_arg [RSB_NAV_index]; retrieval
46:
47:    /* set the upper (or lower) limit for navigational retrieval */
48:
49:    if    ((direction == RSE_get_forward) && retrieval->irb_upper_count)
50:        {
51:        upper.key_length = impure->irsb_nav_upper_length;
52:        MOVE FAST ((impure->irsb_nav_data
53:        + (SLONG) rsb->rsb_arg [RSB_NAV_key_length]),
54:        upper.key_data, upper.key_length);
55:        } else if ((direction == RSE_get_backward)
56:                && retrieval->irb_lower_count)
57:        {
58:        lower.key_length = impure->irsb_nav_lower_length;
59:        MOVE_FAST ((impure->irsb_nav_data +
60:            (SLONG) rsb->rsb_arg [RSB_NAV_key_length]),
61:            lower.key_data; lower.key_length);
62:        }
63:    /*    Find the next interesting node.
64:        If necessary, skip to the next page */
65:
66:    for (;;)
67:        {
68:        node = next;
69:        expanded_node = expanded_next;
70:        if (node)
71:            number = BTR_get_quad (BTN_NUMBER (node));
72:        page = (BTR) window.win_buffer;
73:
74:        /*    in the backwards case, check to make sure we haven't hit the
75:            beginning of a page, and if so fetch the left sibling page.*/
76:
77:        if (direction == RSE_get_backward)
78:            {
79:        if    (node < (BTN) page->btr_nodes)
80:                {
81:            expanded_page = window.win_expanded_buffer;
82:
83:            /* if there is no left sibling, we are at bof */
84:
85:            if (!page->btr_left_sibling)
86:                {
87:                RSE_MARK_CRACK (rsb, rsb_bof);
88:                break;
89:                }
90:
91:            /* otherwise, find the page to the left
92:            and go to the end of it */
93:
94:            page = BTR_left_handoff (&window, page, LCK_read);
95:            expanded_page = NAV_expand_index (&window, NULL_PTR);
96:            next = BTR_last_node (page, expanded_page, &expanded_next);
97:            continue;
```

-continued

```
 98:            }
 99:        }
100:    else
101:         /*  In the forwards case, check for end of page. If we find
102:             it, do a simple handoff to the right sibling page. */
103:
104:        {
105:            if (number == END_LEVEL)
106:                {
107:                RSE_MARK_CRACK (rsb, rsb_eof);
108:                break;
109:                }
110:
111:         /* if find the end of the page, go to the page on the right */
112:
113:            if (number == END_BUCKET)
114:                {
115:            page = (BTR) window.win_buffer;
116:            page = (BTR) HANDOFF (&window, page->btr_sibling,
117:                    LCK_read, pag_index);
118:
119:            next = (BTN) page->btr_nodes;
120:            if (expanded_page = window.win_expanded_buffer)
121:               expanded_next = (BTX) expanded_page->exp_nodes;
122:            continue;
123:                {
124:        }
125:
126:         /*  Build the current key value from the prefix
127:             and current node data. */
128:
129:        if  (expanded_node)
130:            {
131:            if (1 = BTN_LENGTH (node) + BTN_PREFIX (node))
132:                {
133:              p = key.key_data;
134:              q = expanded_node->btx data;
135:            do *p++ = *q++; while (--1);
136:                }
137:
138:            }
139:        else
140:            {
141:            if (1 = BTN_LENGTH (node))
142:                {
143:            p = key.key_data + BTN_PREFIX (node);
144:            q = BTN_DATA (node);
145:            do *p++ = *q++; while (--1);
146:                }
147:        }
148:
149:        1 = BTN_LENGTH (node) + BTN_PREFIX (node);
150:
151:        /* Make sure we haven't hit the upper (or lower) limit. */
152:        if ((direction == RSE_get_forward) && retrieval->irb_upper_count
153:           && compare keys (idx, key.key_data, 1, &upper,
154:             retrieval->irb_generic
155:           & (irb_descending | irb_partial | irb_starting)) > 0)
156:            {
157:        RSE_MARK_CRACK (rsb, rsb_crack);
158:        break;
159:            }
160:        if ((direction == RSE_get_backward)
161:            && retrieval->irb_lower_count
162:            && compare_keys (idx, key.key_data, 1,
163:            &lower, retrieval->irb_generic
164:            & (irb_descending | irb_partial | irb_starting)) > 0)
165:            {
166:        RSE_MARK_CRACK (rsb, rsb_crack);
167:        break;
168:            }
169:
170: // . . .
171:
172:        /* reset the current navigational position in the index */
173:
174:        rpb->rpb_number = number;
175:        if  (direction != RSE_get_current)
176:            set_position (impure, rpb, &window, node,
177:                    expanded_node, key.key_data, 1);
```

```
178:
179:        RELEASE (&window);
180:
181:        key.key_length = 1;
182:        if (get_record (rsb, impure, rpb, &key, FALSE))
183:            return TRUE;
184:
185:        /*  if here, we didn't find the record at the current position,
186:            so it must have been deleted out from under; by definition we
187:            are on a crack (already marked by get_record( )) */
188:
189:        if (direction == RSE_get_current)
190:            return FALSE;
191:
192:        next = get_position (rsb, impure, &window,
193:                    direction, &expanded_next);
194:        }
195:
196:    RELEASE (&window);
197:
198:    /* crack, bof, or eof must have been set at this point */
199:
200:    return FALSE;
201:    }
(line numbers added)
```

As shown (at lines 2–5), the function is invoked with four parameters: rsb, impure, rpb, and direction. Direction simply indicates whether the method is to operate in a forward or backward direction. Impure is a pointer to an area which is the variable-link tail of a request—that is, the data area of a request. In the context of this routine, the area is used for storing index descriptions, for example. The rsb and rpb parameters require further explanation.

The rsb parameter defines a Record Source Block. This is a data member describing the record stream and, thus, acts as a descriptor for the record. In an exemplary embodiment, the record source block may be constructed as follows:

```
/* Record Source Block */
typedef struct rsb {
    struct blk    rsb_header;
    RSB_T         rsb_type;
    UCHAR         rsb_stream;
    USHORT        rsb_count;
    USHORT        rsb_flags;
    ULONG         rsb_impure;
    ULONG         rsb_cardinality;
    struct rsb    *rsb_next;
    struct rel    *rsb_relation;
    struct str    *rsb_alias;
    struct prc    *rsb_procedure;
    struct fmt    *rsb_format;
    struct nod    *rsb_any_boolean;
    struct rsb    *rsb_arg [1];
} *RSB;
```

The data members function as follows:

(a) rsb_header: rsb header
(b) rsb_type: type of rsb
(c) rsb_stream: stream, if appropriate
(d) rsb_count: number of sub arguments
(e) rsb_flags: flags
(f) rsb_impure: offset to impure area
(g) rsb_cardinality: estimated cardinality of stream
(h) *rsb_next: (pointer to) next rsb, if appropriate
(i) *rsb_relation: (pointer to) relation, if appropriate
(j) *rsb_alias: (pointer to) SQL alias for relation
(k) *rsb_procedure: (pointer to) procedure, if appropriate
(l) *rsb_format: (pointer to) format, if appropriate
(m) *rsb_any_boolean: (pointer to) any/all boolean The other parameter, rpb, describes a Record Parameter Block or RPB data structure:

```
/* Record Parameter Block */
typedef struct rpb {
    SLONG      rpb_number;
    SLONG      rpb_transaction;
    struct rel    *rpb_relation;
    struct rec    *rpb_record;
    struct rec    *rpb_prior;
    struct srpb   *rpb_copy;
    struct rec    *rpb_undo;
    USHORT     rpb_format_number;
    SLONG      rpb_page;
    USHORT     rpb_line;
    SLONG      rpb_f_page;
    USHORT     rpb_f_line;
    SLONG      rpb_b_page;
    USHORT     rpb_b_line;
    UCHAR      *rpb_address;
    USHORT     rpb_length;
    USHORT     rpb_flags;
    struct win    rpb_window;
} RPB;
```

The data members function as follows:

(a) rpb_number: record number in relation
(b) rpb_transaction: transaction number
(c) *rpb_relation: (pointer to) relation of record
(d) *rpb_record: (pointer to) final record block
(e) *rpb_prior: (pointer to) prior record block if this is a delta record
(f) *rpb_copy: (pointer to) rpb copy for singleton verification
(g) *rpb_undo: (pointer to) the first version of data if this is a second modification
(h) rpb_format_number: format number in relation
(i) rpb_page: page number
(j) rpb_line: line number on page
(k) rpb_f_page: fragment page number
(l) rpb_f_line: fragment line number on page
(m) rpb_b_page: back page (n) rpb__b__line: back line
(o) *rpb__address: address of record without header
(p) rpb__length: length of record
(q) rpb__flags: housekeeping flags
(r) win: window into table When a record is read in by the system, the information for the record (e.g., stored in the record header) is copied to the Record Parameter Block. This, in turn, stores a pointer to the actual record (i.e., data) itself.

In general, the NAV__get__record method operates by retrieving a record from the record stream, either in a forward or backward direction (or the current record). The routine then sets BOF (Beginning of File), EOF (End of File), and Crack (i.e., current crack—position before or after a record). Collectively, these are logical constructs which assist in navigation. The record source block (rsb) stores a flag indicating a current state of the record stream—that is, whether at BOF, EOF, or crack. The record stream description, in this context, is a description of the table (i.e., stream of records). Thus, rsb describes that stream. The impure area, for this routine, stores all the indexes for this record stream (table). Also, recall that there is a node in the prefix compressed page and a corresponding node on the expanded page (i.e., the "expanded node"). Those two pointers move in lockstep during the method; if one is updated, so is the other.

The method begins by setting up state information about the current location (i.e., where the user is currently positioned, logically, in the table). The method sets up a "window block" which is a logical data structure into which a data page may be retrieved. This creates a "window" into the database file. At this point, the window block is set to a particular page. The method proceeds to retrieve the corresponding BTN—the B-tree node for that page which is at the current position. In other words, at this point the method gets the page number from the impure area and then fetches that page (i.e., B-tree leaf page); this tells the system the current position in the table.

Next, the method extracts the data from the B-tree node and stores it in a local key variable. Specifically at this point, the method reads the key from the impure area and copies it into a local key variable. This is done in preparation for retrieving data via an index. The method then sets the end condition: the key value at which the method will stop retrieving data. The end condition sets an upperbound (i.e., a value which is not to be exceeded) when traversing in a forward direction, and sets a lowerbound (i.e., a value below which further retrieval is not desired) for backward traversal. At this point, the method has performed initialization and found the previous node.

The method proceeds to find the next node as follows. A loop is established to look for the next node, either forward or backward (depending on the input parameter). If necessary, the method will cross a page boundary—skipping to the next page. In the backward case, the method fetches the left sibling page. If there is no left sibling, then the method has reached the beginning of the file (BOF). If, however, a left sibling is present, the method traverses backwards by performing a left handoff. Thus, intrapage navigation switches to interpage navigation once the end of the current page (i.e., being navigated) has been reached. In the instance where the beginning of file is reached, the BOF flag is set accordingly. Similarly, the EOF flag is set for the instance where the method has reached the end of the file. In the instance where interpage navigation is required, the handoff is performed using a fault-tolerant method described below (under interpage navigation). In a forward traversal, the method performs a locked handoff to a right sibling page, upon reaching the end of a current page. If the method reaches the end of file, it sets the EOF flag.

During the traversal, the method keeps the current key value (i.e., the one stored in the local variable) up to date with the new node. If the method, for instance, has traversed backwards, it must go to the expanded node for retrieving the current key value (because the key values are prefix compressed). For going forward, however, the method need not expand the page. Instead, the key value is set to the current key data plus the prefix. In other words, when traversing forward, the prefix is already known, without having to access the expanded node. The method next checks the boundary limit (i.e., upper or lower limit), for determining whether the boundary has been reached. This is done by comparing the current key against the upper (or lower) value limit. Upon reaching the limit, the crack is set accordingly and the method breaks out of the loop.

The method then calls a set__position routine for setting the current position to the one found. Recall that when the method was invoked, the current position was determined from the impure area. The call to set__position now sets the position of the impure area to reflect the node found. The method then concludes by releasing the logical window (i.e., releasing the lock from the B-tree page). The method may now retrieve the physical data record, which is stored on a data page. If a physical data record is retrieved, the method is done. If not, however, the method continues in the loop, for getting the next node. If the method is successful in finding a record, it returns a Boolean value of true; otherwise, it returns a Boolean value of false.

2. Interpage

Left-to-right interpage navigation may be done in a conventional manner, by using a locked handoff. The right-to-left navigation cannot be done in the same conventional manner, however, as deadlocks will result. A fault-tolerant method for traversing prior pages (i.e., right-to-left traversal), yet avoiding deadlocks, is as follows. The current page is released and the system proceeds to the previous page. Once at the previous page, the system checks whether that page's forward pointer points to the page which was just left. If the two are not identical, the system reads the forward pointer of the then-current page and then traverses to the right. It continues this rightward traversal until it reaches the page which it originally departed from. Once there, the system repeats the process of going left until it reaches a page whose forward pointer agrees with the page which was just departed from. Instead of handing off, therefore, the system just assumes at the outset that the new page is correct. That assumption is then verified to confirm that the new page's forward pointer agrees with the page number of the page which was departed from. If the validation does not hold true, the system steps right until it returns to the original page, whereupon it repeats the process until a new page is found whose forward pointer agrees with the page number of the original page.

Figure 7:
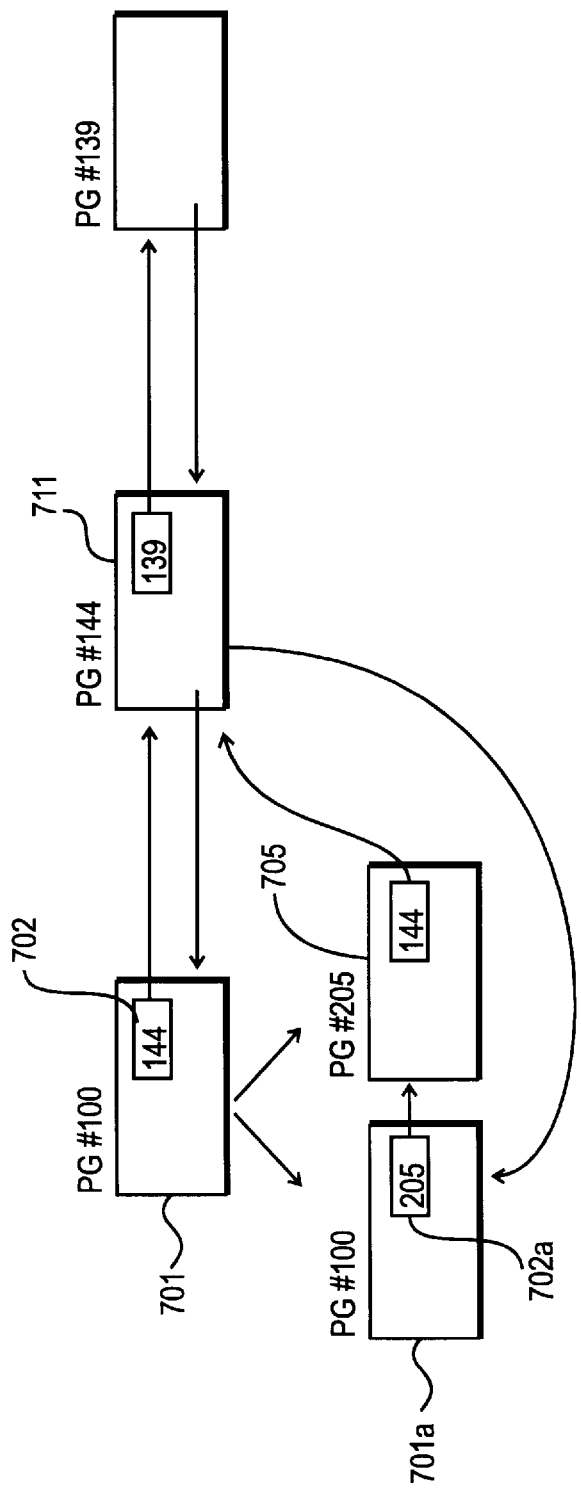
FIG. 7 is a block diagram illustrating the effect of page splitting on the page pointers which are stored on the various pages.

FIG. 7 illustrates the effect of page splitting on the page pointers. Initially, page #100 (shown at 701) stores a Page Pointer 702 pointing to page #144 (shown at 711). Page #100 splits into two pages: page #100 (shown at 701*a*) and page #205 (shown at 705). As a result of the split, the forward page pointer for record #100 is set to the value of 205 (shown at 702*a*); page #205 has its forward page pointer set to the value of 144, thereby linking these two pages into the page chain.

At this point, however, backward pointers (e.g., backward pointer of page #205) are not updated. Preferably, the first process which traverses backwards and finds an incorrect backward-pointing pointer corrects it. In this manner, the overhead for updating backward pointers is shifted to those clients requiring bi-directional scrollable cursors. For a client or user which does not require bidirectional scrollable cursors, therefore, there is little or no impact on performance since those clients employ a left-to-right traversal methodology which does not include any overhead for backwards traversal.

In an exemplary embodiment, a left handoff method may be constructed in the C programming language as follows:

```
 1: BTR BTR_left_handoff (window, page, lock_level)
 2: {
 3: /**************************************
 4:  *
 5:  *    BTR_left_handoff
 6:  *
 7:  **************************************
 8:  *
 9:  * Functional description
10:  * Handoff a btree page to the left. This is more difficult than a
11:  * right handoff because we have to traverse pages without handing
12:  * off locks. (A lock handoff to the left while someone was handing
13:  * off to the right could result in deadlock.)
14:  *
15:  **************************************
16: SLONG    original_page, sibling, left_sibling;
17: WIN   fix_win;
18: BTR   fix_page;
19: DBB   dbb;
20:
21: /* set local variables to original page and its left sibling */
22:
23: original_page = window->win_page;
24: left_sibling = page->btr_left_sibling;
25:
26: /* release the current window first; opens a race condition
27: in which someone else could update the page so we need to be able to
28: handle a page which is inserted to the left of us */
29:
30: RELEASE (window);
31:
32: /* fetch the page to the left */
33:
34: window->win page = left_sibling;
35: page = (BTR) FETCH (window, lock_level, pag_index);
36:
37: /*   if the page is the one we were expecting based on the page number
38:      cached on the original page, we're done */
39:
40: if    ((sibling = page->btr_sibling) == original_page)
41:      return page;
42:
43: /* Since not handing off pages, a page could spilt before
44:  * we get to it. To detect, fetch the left sibling pointer and
45:  * then handoff right sibling pointers until reach the page
46:  * to the left of the page passed to us.
47:  */
48:
49: // while no match
50:
51: while (sibling != original_page)
52:      {
53:      /* do handoff to right */
54:      page (BTR) HANDOFF(window,page->btr_sibling,lock_level, pag_index);
55:      sibling = page->btr_sibling;
56:      }
57:
58:      fix_win.win_page = original_page;
59:      fix_page = (BTR) FETCH (&fix_win, LCK_write, pag_index);
60:
61: /*   Check to see whether someone already pointed the original
62:      page to point to the new left page, if so just return. */
63:
64: if   (fix_page->btr_left_sibling == window->win_page)
65:      {
66:      RELEASE (&fix_win);
67:      return page;
68:      }
69:
70: /* fix up the original page to point to the new left sibling */
71:
72: MARK (&fix_win);
```

-continued

```
73:    fix_page->btr_left_sibling = window->win_page;
74:    RELEASE (&fix_win);
75:
76:    return page;
77: }
```

The method is invoked with a window, which is a logical window into the current physical page. Page is the page number. Lock level is the level at which the new page is to be locked. In a scan through the table, for instance, the page may be locked at the level of "read." The left handoff method hands off a B-tree page to the left. As noted above, this task is more difficult than a right handoff since pages are traversed without handing off locks. The method initializes local variables to store the original page and its left sibling (lines 21–24). Next, the method releases the current window (line 30). Note in particular that this creates a race condition in which another task could insert a page to the left of the original page. Therefore, additional logic (described below) is required for detecting and handling this condition. After releasing the window, the method fetches the page to the left (lines 32–35). Page is set to point to the B-tree page (line 35).

If the page just fetched is the one expected by the method, the method has completed its task and may return page. This determination is made by comparing the page number of the original page to the forward page pointer of the left sibling page (lines 40–41). Otherwise, the page has been split and requires additional processing. This case is handled by fetching the left page (i.e., the next left page) and then continue a right handoff until the method reaches the page to the left of the page passed in. This is done by the "while" loop of lines 51–56. The actual right handoff is done at line 54, by calling a HANDOFF routine. At line 58, the method fixes up the original page to point to the new left page. The method then checks to see whether another process has already pointed the original page to point to the new left page (lines 61–64). In such a case, the method releases the logical window and returns the page. If this has not happened, however, then the method fixes up the original page to point to the next left sibling and thereafter releases the fixed up page and returns page (lines 70–76).

(d) Natural Order Navigation

Figure 8:
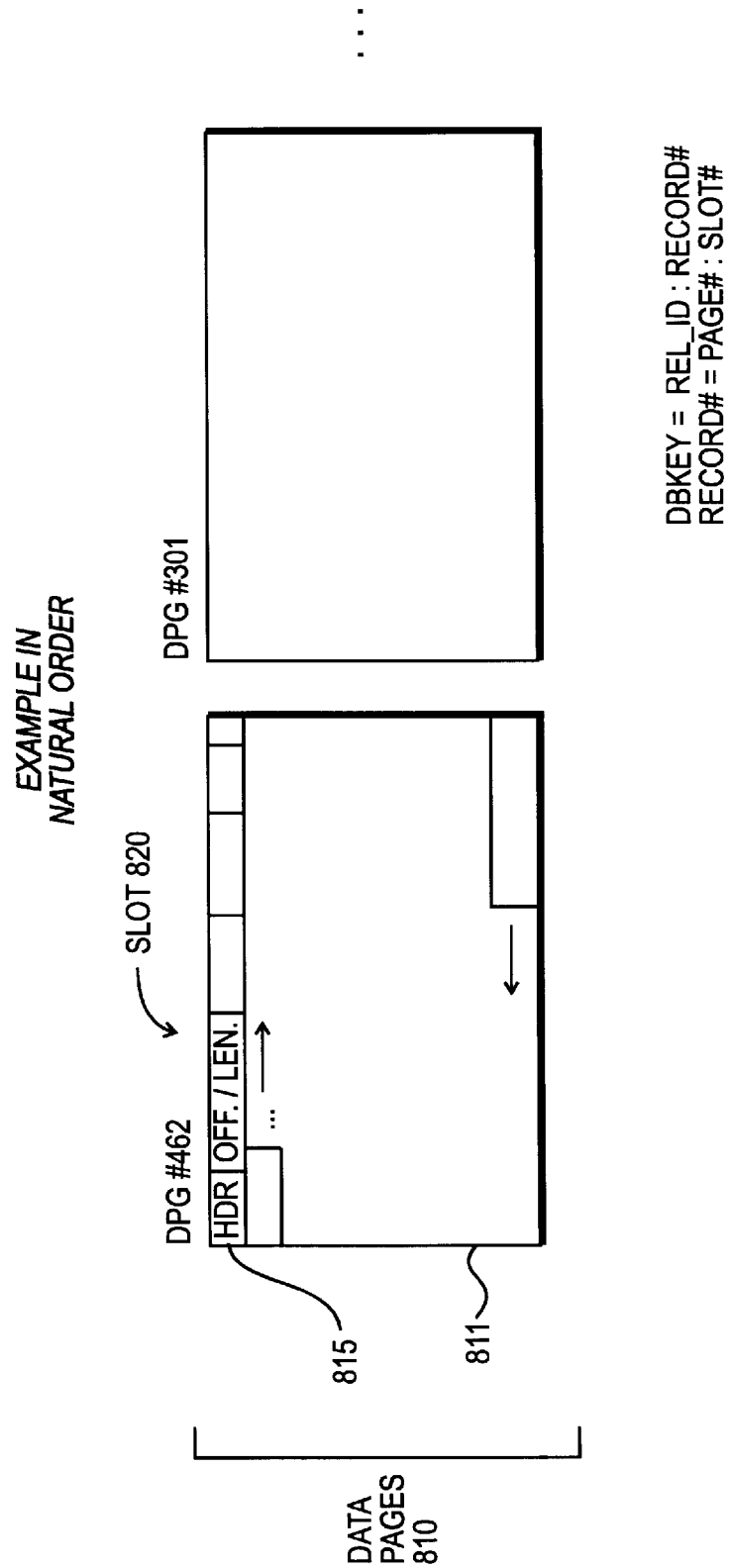
FIG. 8 is a block diagram illustrating natural order navigation among data records stored on data pages (which form a table) in the system of the present invention.

FIG. 8 illustrates traversal of records in natural order (i.e., without an index). The figure shows a sequence of on-disk data pages (DPG constructs) 810 which comprise a table. Each data page comprises a header followed by a plurality of slots (e.g., slot 820), each slot storing an offset/length pair. The slots, in effect, function as a directory to the actual data records themselves (which can be stored any other place on the data page). The slots grow up from the beginning of the data page, and the data records grow down from the end of the data page. The data pages themselves, however, can be physically located anywhere in the database. As a record is deleted, the space occupied by the record is freed (i.e., available for storage of another record). As a new record is added, it is placed on the first free space. As a result, the natural order of the table is random.

Because of the semantics of PC DBMS systems, users expect natural order to imply something other than a random arrangement. SQL users, on the other hand, expect no such ordering, unless they explicitly request ordering by using the "ORDER BY" SQL command. To accommodate navigational users, therefore, the Database Server is modified to provide a unique identifier—dbkey—for identifying a particular record. In essence, it serves as a handle for fetching a particular record.

In an exemplary embodiment, the dbkey comprises two long words storing a relation (table) ID and a record number. The record number here is a logical construct, derived from the page number combined with the slot number for the data record. To navigate forward through database pages in natural order, the system increments a record number variable and attempts to fetch the record with that number (i.e., page/slot combination). If the record number does not exist, the system simply continues on to the next one. In a similar manner, navigating in reverse in a natural order table comprises decrementing the record number (variable), fetching the record associated with that record number (if any), and continuing on in that fashion.

(e) "Bookmark"

The Database Server is also modified to provide a "bookmark"—an indication of where the user is currently located in the table. Once a key is found for a particular record, the database server maintains the location as a bookmark. This, in turn, is surfaced to the Client. To explain the concept of a bookmark, it is helpful to understand how records are stored by the Database Server.

The actual data for a relation is stored on data pages. Each data page is essentially an array of records with the following format:

page header; available data page flags:
    data page is orphaned—it does not appear in any pointer page
    page is full
    a blob or array is on page
sequence number of this data page in the relation; for integrity checking
relation id of this relation; used for integrity checking
number of records or record fragments on this data page
an array of record descriptors, each of the format:
    offset of record or record fragment
    length of record or record fragment
records and record fragments Thus, a data page may be viewed as an array of pointers to records, together with the records themselves.

A record descriptor describes the location and size of records stored on a given page. For each record, the page stores a record descriptor in an array at the top of the page. As records are stored, the array grows down the page and the records are stored backwards from the end of the page until they meet in the middle. Records vary in size, so that the number of records that can fit on a data page varies. Records can be erased, leaving holes on the page. Calculation of the amount of free space on page is done by looking at the size of all records on page. If necessary to make room for a larger record, the page will be compressed to remove all holes. When the free space is less than the size of the smallest possible record fragment, the page is considered full.

A record is uniquely identified by its record number, known outside the engine (i.e., surfaced to clients) as the dbkey. Conceptually, the record number identifies the offset from the beginning of the relation. The record number generally does not reflect the number of records stored. The record number is calculated by determining how many records could potentially be stored between the beginning of a relation and the current record. This will be explained by way of example.

Consider a database with page size of 1024 bytes and a pointer page size of 1000 bytes. For a slot size of 4 bytes, 250 slots are available on the pointer page, and a total of 1008 bytes available on a data page. If the smallest possible record used 22 bytes (e.g., minimum record data of 6 bytes (using padding if necessary), record header of 12 bytes, and record descriptor of 4 bytes), a maximum of 45 records can be stored on a data page. The record number, in turn, is calculated as:

<max number of records on previous data pages>+<line number on data page>, where the first value is:

<number of data pages stored on previous pages>*45 and the first value is:

<pointer page number>*250+<data page slot>.

The formula for determining record number is thus:

<pointer page number>*250+<data page slot>* 45 +<line number>.

Note that record numbers are not necessarily sequential. Unused record numbers may arise since most relations have more than 6 bytes of data per record. In addition, records can be modified and erased, leaving extra space on data pages.

Using the above-described fault-tolerant method, the system can retrieve the data record corresponding to a given record number (i.e., in natural order). In general, the approach is as follows. First, the system assumes that the key value stored at that offset indicated by the record number has not been updated. Next, the system verifies this assumption by comparing the key value found with the one which is expected. The page number, the offset on the page, and the key value are all cached, so that the information can be readily retrieved. When it is retrieved, however, the information is verified by comparing the two key values. In the instance where the key value has changed (i.e., another client has updated the page), the system goes back to the beginning of the page to again look for the key. If the key cannot be located on that page (e.g., the page has been split), the system continues in a left-to-right direction until the key is located. If the key value is found, then the bookmark is reset to that new position. If the key value is not found (i.e., a key value is located which is past the one sought), on the other hand, the record for that bookmark has been deleted by another client. In that case, the bookmark is set to point to the position (i.e., the "crack") just before the key value located which is greater than the key value sought. The crack is, therefore, set to the position where the prior record was deleted.

In an exemplary embodiment, a get_bookmark method may be constructed as follows (using the C programming language).

```
1:   void NAV_get_bookmark (rsb, impure, bookmark)
2:   {
3:   /****************************************
4:    *
5:    *    NAV_get_bookmark
6:    *
7:    ****************************************
8:    *
9:    * Functional description
10:   *    Return a descriptor containing a pointer
11:   *    to a bookmark data structure which describes
12:   *    the current location of a navigational stream.
13:   *
14:   ****************************************/
15:
16:  /* store info necessary to return to this location in the index */
17:
18:  bookmark->bkm_number = impure->irsb_nav_number;
19:  bookmark->bkm_page = impure->irsb_nav_page;
20:  bookmark->bkm_incarnation = impure->irsb_nav_incarn;
21:
22:  /* store current key value, set the key descriptor to point at it */
23:
24:  bookmark->bkm_key_desc.dsc_dtype = dtype_text;
25:  bookmark->bkm_key_desc.dsc_length = impure->irsb_nav_length;
26:
27:  MOVE_FAST (impure->irsb_nav_data, bookmark->bkm_key_data,
28:       impure->irsb_nav_length);
29:  }
```

The method is invoked with three parameters: rsb, impure, and bookmark. The Record Source Block or rsb (previously-described) identifies the current record stream. The impure area (previously-described) represents state information of a request (i.e., "where" a request is in its current state of execution).

Bookmark points to a storage block—a bookmark block—for storing bookmark data. In an exemplary embodiment, a bookmark data structure, BKM, may be constructed as follows:

```
/*  bookmark block, used to hold information about the current position
    within an index; a pointer to this block is passed to the user as a
    handle to facilitate returning to this position */
typedef struct bkm {
    struct blk      bkm_header;
    struct bkm      *bkm_next;
    struct dsc      bkm_desc;
    ULONG           bkm_handle;
    SLONG           bkm_number;
    SLONG           bkm_page;
    SLONG           bkm_incarnation;
    SLONG           bkm_expanded_offset;
    USHORT          bkm_offset;
    USHORT          bkm_flags;
    struct dsc      bkm_key_desc;
    UCHAR           bkm_key_data [1];
} *BKM;
```

The data members function as follows:

(a) bkm_header: bookmark header (b) *bkm_next: pointer to next bookmark (c) bkm_desc: bookmark descriptor describing the bookmark handle (d) bkm_handle: bookmark handle containing pointer to this block (e) bkm_number: current record number (f) bkm_page: current btree page (g) bkm_incarnation: last known incarnation number of current btree page (h) bkm_expanded_offset: offset into expanded index page (if it exists)

(i) bkm_offset: offset into current btree page (j) bkm_flags: flag values (k) bkm_key_desc: descriptor containing current key value (l) bkm_key_data [1]: current key value The set_bookmark method, at lines 18–20, stores information which enables the system to return to this location (i.e., the current location) in the index. This is done by storing the page number, the page offset (i.e., into the actual B-tree page itself), and "incarnation" (i.e., the number of times which it has been updated). Next, the method stores the current key value, setting a key descriptor to point to it (lines 22–25). This indicates what the fully-expanded key value is at the current location. This information is copied into the impure data area (line 28).

The set_bookmark routine is the "flipside" of the get_bookmark routine. In an exemplary embodiment, a set_bookmark method may be constructed as follows (using the C programming language).

```
 1:    BOOLEAN NAV_set_bookmark (rsb, impure, rpb, bookmark)
 2:    {
 3:    /******************************************
 4:     *
 5:     *   NAV_set_bookmark
 6:     *
 7:     ******************************************
 8:     *
 9:     * Functional description
10:     *   Set up the impure area so that the current
11:     *   position of the stream is that of the
12:     *   stored bookmark.
13:     *
14:     ******************************************
15:
16:    /* save the bookmark state in the impure area for the stream */
17:
18:    impure->irsb_nav_number = bookmark->bkm_number;
19:    impure->irsb_nav_incarnation = bookmark->bkm_incarnation;
20:    impure->irsb_nav_offset = bookmark->b
21:
22:    /* store current key value, set key descriptor to point at it */
23:    impure->irsb_nav_length = bookmark->bkm_key_desc.dsc_length;
24:    MOVE_FAST (bookmark->bkm_key_data, impure->irsb_nav_data,
25:        bookmark->bkm_key_desc.dsc_length);
26:
27:    /* if on a crack, BOF or EOF, don't bother to retrieve a record */
28:
29:    if    (rsb->rsb_flags & (rsb_bof | rsb_eof | rsb_crack))
30:        return FALSE;
31:
32:    /*  go ahead and fetch the physical record into the rpb area */
33:    return NAV_get_record (rsb, impure, rpb, RSE_get_current);
34:    }
```

As before, the method is passed parameters of rsb, impure, and bookmark. In addition, however, it is also passed a record parameter block, rpb. This is so that the current position in the bookmark may be used to set the current record position (as expressed by rpb). At the conclusion of the method, rpb will point to the new record. At lines 16–20, the method stores into the impure area the same data values which were retrieved with the get_bookmark method (i.e., number, incarnation, and offset). At lines 23–25, the method stores into the impure area the key value from the bookmark. At lines 27–30, if the current position lies on a crack, BOF, or EOF, the method will not bother retrieving a record and will simply return false (line 30). Otherwise, the method will fetch the physical record into the rpb area and return that record as its result (lines 32–33).

A stream may be set to the location of the specified bookmark:

```
 1: static NOD set_bookmark (node)
 2: {
 3: /***************************************
 4:  *
 5:  *   set_bookmark
 6:  *
 7:  ***************************************
 8:  *
 9:  * Functional description
10:  *   Set a stream to the location of the
11:  *   specified bookmark.
12:  *
13:  ***************************************/
14: TDBB    tdbb;
15: REQ     request;
16: BKM     bookmark;
17: USHORT  stream;
18: RPB     *rpb;
19: RSB     rsb;
20:
21: tdbb = GET_THREAD_DATA; request = tdbb->tdbb_request;
22: BLKCHK (node, type_nod);
23:
24: if  (request->req_operation == req_evaluate)
25:     {
26:     bookmark = BKM_lookup (node->nod_arg [e_setmark_id]);
27:     stream = (USHORT) node->nod_arg [e_setmark_stream];
28:     rpb = &request->req_rpb [stream];
29:     rsb = *((RSB*) node->nod_arg [e_setmark_rsb]);
30:
31:     */  check if the bookmark was at beginning or end of file
32:         and flag the rsb accordingly */
33:
34:     RSE_MARK_CRACK (rsb, 0);
35:     if (bookmark->bkm_flags & bkm_bof)
36:         RSE_MARK_CRACK (rsb, rsb_bof);
37:     else if (bookmark->bkm_flags & bkm_eof)
38:         RSE_MARK_CRACK (rsb, rsb_eof);
39:     else if (bookmark->bkm_flags_& bkm_crack)
40:         {
41:         RSE_MARK_CRACK (rsb, rsb_crack);
42:         if (bookmark->bkm_flags & bkm_forced_crack)
43:             RSE_MARK_CRACK (rsb, rsb_forced_crack);
44:         }
45:
46:     if (!RSE_set_bookmark (rsb, rpb, bookmark))
47:         EXE_mark_crack(rsb,rsb->rsb_flags&(rsb_crack|rsb_eof|rsb_bof));
48:
49:     request->req_operation = req_return;
50:     }
51:
52: return node->nod_parent;
53: }
```

Finally, the bookmark is released by:

```
 1: static NOD release_bookmark (node)
 2: {
 3: /***************************************
 4:  *
 5:  *   release_bookmark
 6:  *
 7:  ***************************************
 8:  *
 9:  * Functional description
10:  *   Deallocate the passed bookmark.
11:  *
12:  ***************************************
13: TDBB tdbb;
14: REQ request;
15:
16: tdbb = GET_THREAD_DATA; request = tdbb->tdbb_request;
17: BLKCHK (node, type_nod);
18:
19: if (request->req_operation == req_evaluate)
20:     {
21:     BKM_release (node->nod_arg [e_relmark_id]);
22:     request->req_operation = req_return;
23:     }
24:
25: return node->nod_parent;
26: }
```

Alternative embodiment: Alerting clients of obsolete records in local caches

A. Overview

A problem exists in client/server environments when a client displays a large number of records, such as in a "browse" mode. Consider the Client/Server System 900, shown in FIG. 9A. Here, client 910 is displaying numerous records 915 to the user. The particular problem occurs when updating certain records (e.g., such as changing a value in record 917, or changing a value in record 919) in the face of other updaters. Since the possibility exists that other updaters 920 in the system may be concurrently posting updates, it is desirable to have the latest version of the records at the client 910 when updates are made, to avoid an instance where the client updates otherwise obsolete records. In a read-only mode of operation, therefore, a problem exists at the client that the data might be obsolete or stale.

Further, the user at the client might want to update the data displayed on screen, for instance, by clicking on a display field, entering a new field value, and having that update be applied to the underlying database table by the server 950. A dual update problem emerges. If an update is applied to the record at the database, it may turn out that the record has in fact already been changed by an earlier updater. In conjunction with this problem is the issue of transaction atomicity. As each record is updated, it is not very efficient to send each record, one at a time, to the database server for posting to the table. Therefore, database systems generally transmit changed records back to the server only after a certain number of records have been updated. In other words, the general approach is to batch record changes, for transmission back to the server.

The particular problem which occurs with such a batch update is that if any one of the updated records is "bad" (i.e., creates a conflict), then the updating client must decide what to do about the update conflict. For instance, does the client update some of the records of the batch, except for the ones which conflict? Or does the client figure out what is the difference between the conflicting updates and apply a delta? Or does it simply abort the update and require the user to re-enter changes? Most systems adopt the latter, simplistic approach, despite the inconvenience to the user.

B. Client caches

Figure 9A:
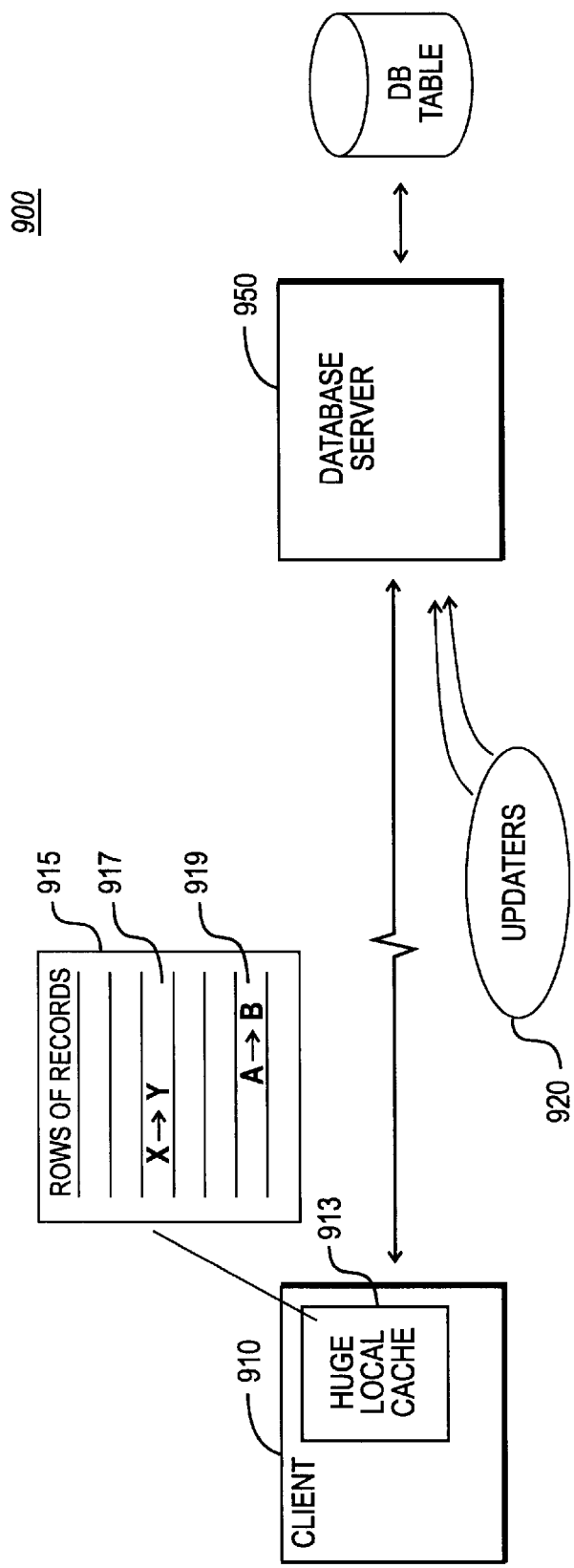

Present day client/server systems generally implement a huge client-side cache, such as the cache 913, shown for the client 910 in FIG. 9A. Typically, such systems "load up" (i.e., fill) the back-end cache with a multitude of records from the server, in an effort to provide some semblance of performance which users are accustomed to with navigation, desktop-based database systems (e.g., dBASE). Such systems accept some tradeoff in that the data records in local cache are "slightly stale." For most applications, the approach of slightly stale data is acceptable.

One approach to improving the currency of the client cache is to employ a "refresh range," such as fould in Borland's Paradox® DBMS. Here, the user specifies a time interval in which the system will refresh the records which the user is currently viewing. If the user is currently browsing 25 records with a refresh interval set to 10 seconds, for instance, the system will re-fetch the records for updating the view. In this manner "currency" is maintained (as opposed to "concurrency"). Here, the system knows that the records are current within a certain time interval (e.g., ten seconds). As additional users are added to such a system, the disadvantages of the approach become apparent, however. Imagine, for instance, adding 100 users, each re-fetching 25 records every 10 seconds. Here, much of the server's resources are tied up processing a multitude of refresh queries. Performance and throughput of the system suffer as a result.

Figure 9B:
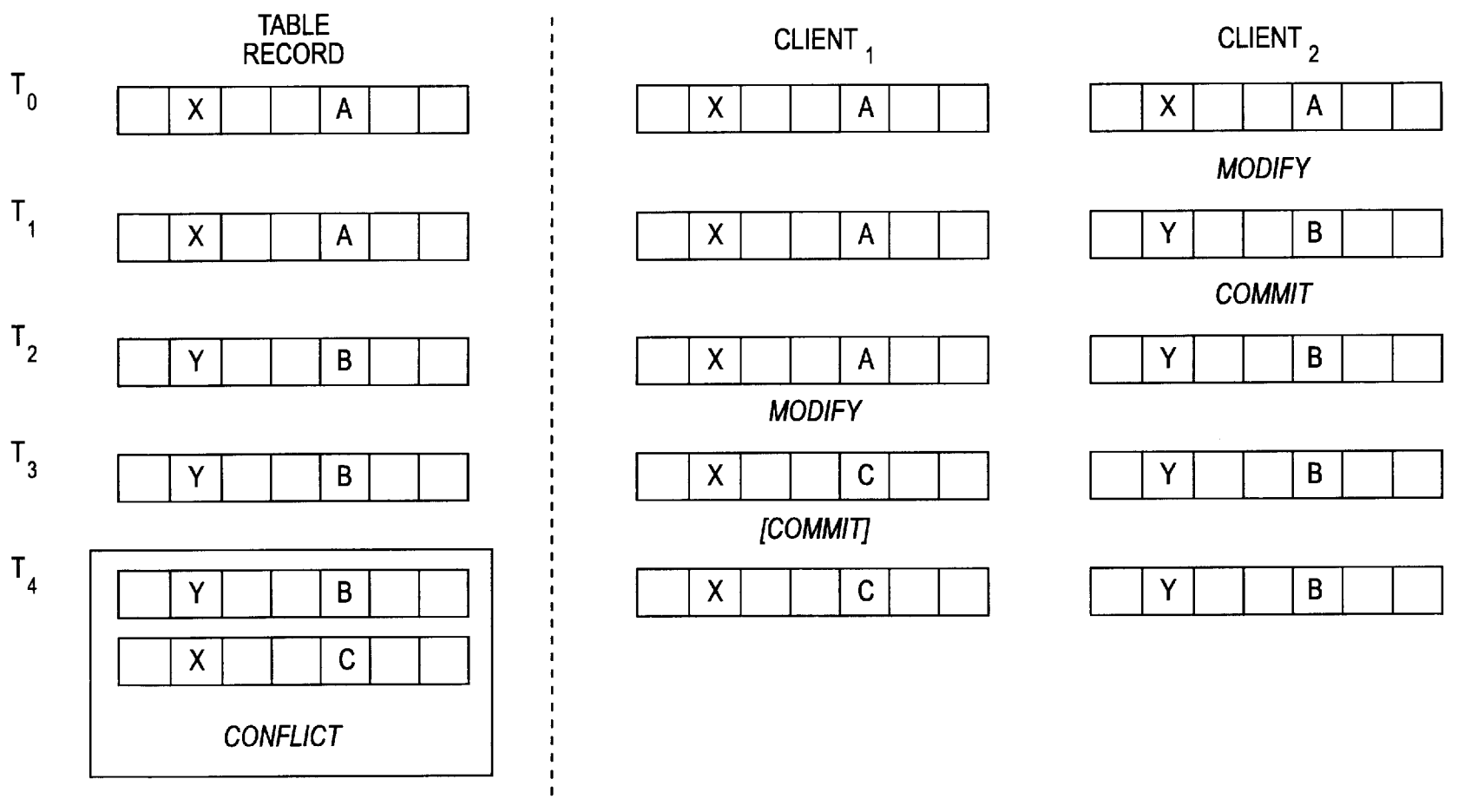

Even if currency of the cache is improved, a problem still exists with updating records. In particular, it is possible that one user might update a record based on that user's stale copy of the record. This problem is illustrated in FIG. 9B. Here, one client attempts to update a record in the table (at $T_3$) while a second client has already updated the table copy (at $T_1$), thus rendering the first client's local copy stale. In conventional systems, such a conflict is typically reported back to the user, who must then re-edit the record. Although a locking mechanism can be employed to exclude others from changing the underlying data, such a mechanism interferes with the ability of others to update a table when a first client or user is simply reading the table. As a result, exclusive locks are often not employed in this context (i.e., multiple browsing clients) in a multi-user environment.

Alternatively, in some systems (e.g., Lotus Notes), the system attempts to reconcile conflicts between updating clients, at least to the extent that each conflicting record has a change occurring in a field which does not conflict with the change of the other. For instance, if a first client posts a change to the last name field of a record and a second client posts a change to the state field of the same record, a system could resolve this apparent conflict by simply allowing the posted modifications to each field.

The approach is not without disadvantage, however. In particular, the approach affects referential integrity and atomicity of transactions. Regarding referential integrity, it is possible that one field in the table is dependent on the value of other fields of the table. In the foregoing example, for instance, a trigger could be defined for the database which specifies that a particular field—a third field—is calculated from values of the first two fields (i.e., third field=first field+second field). When an update occurs to either of the first two fields, the trigger fires and thereby updates the third field.

When a system reconciles update conflicts by adding individual fields from different update records, it is possible for certain update operations (e.g., triggers) to occur which are not what was intended. For instance, had an application program known that individual updates to fields might be combined in a single record, the application might have chosen not to perform the otherwise-requested logic (e.g., employing a trigger to store the sum of two fields in a third field). All told, intra-record dependencies might exist which prevent the foregoing reconciling approach from achieving its intended effect.

In more sophisticated systems, record updates are treated as atomic events: an update either occurs in its entirety, or it does not occur at all (i.e., it fails). Thus, in systems which enforce "atomicity" of transactions, the transaction is the finest granularity of operation supported—that is, transactions occur at an atomic level. Thus, if a transaction specifies the update of multiple records, the user of such a system desires that either the records are updated all at once (i.e., during the transaction) or not at all.

The problem which exists is therefore two-fold. First, a problem exists when reading data in that the data might be stale (i.e., it has been changed subsequent to retrieving the data from the server). A second problem occurs with updates in that the client might be updating a record in a manner which is not desired, had the client known that an intervening update had occurred. This is particularly true in instances of intra-record dependencies.

C. Improved client cache ranges

The system maintains a cache of records on the client side. Since this client cache can be quickly obsoleted in a multi-user environment with concurrent updaters, it is desirable for the client to be informed when the cached records have been rendered obsolete. In the classic approach to client/server computing, the client "acts" on the server. For instance, the client acts on the server by requesting records (e.g., through a query), or the client takes a lock out, or the client performs some other action on the server, as required by its application logic. In such a model, the server assumes a passive role; it only participates to the extent to which it is requested by the client. Even when the server returns an error message indicating an update conflict, it does so only as a direct result of servicing a request of the client; this is the only extent that the server participates in this interaction between client and server.

The present invention introduces the notion of a "cache range" to achieve this. The client establishes a cache range so that it can be assured that its data is up-to-date. When one or more records in the cache range change, the server sends a notification that the cache range has changed. In a preferred embodiment, the server of the present invention includes an event alerter mechanism; a mechanism for alerting clients of the occurrence of particular events which are of interest to the clients. The event alert mechanism is described in commonly-owned application Ser. No. 07/737, 382, filed Jun. 29, 1991, now pending, the disclosure of which is hereby incorporated by reference. The event alerter allows the client to avoid polling the server and refetching data at a given interval.

Employing an event alerter-based cache range, the foregoing client/server approach to updating records can be reversed as follows. Instead of the client taking a lock out for updating a record, the client simply indicates to the server which records it is interested in (e.g., via registering an event alerter request), whereupon the server manages its resources as necessary to notify the client of a change in one of the records which is of interest to the client. In effect, instead of a client/server approach to updating records, a server/client approach is adopted.

Although the client indicates to the server which record it is interested in, it should be noted that the client has, in a preferred embodiment, already done this when it makes the initial request for the records. Thus at the time of submitting this request, the client can simply also indicate in the same request that these are records which the client desires to know if any changes are posted. Accordingly, the server can simply take out "interest" locks on the corresponding records; these are not locks which exclude the resource from other clients. Other clients are not prevented from accessing this resource (i.e., the records which are of interest). Instead, each interest lock serves as a latch which holds onto a record until another client indicates an interest, whereupon the latch is released (so that it does not prevent concurrent use of that object). In this manner, the interest lock can be employed to notify a client that a record is in use by another client. The lock does not, however, prevent concurrent access to that record. The interest lock is employed in conjunction with the registered event alerter for notifying the client that the record or records of interest are now in use by another client. In this manner, the server undertakes action to indicate to the client when the client local buffer might be stale.

D. Client requests

Figure 10:
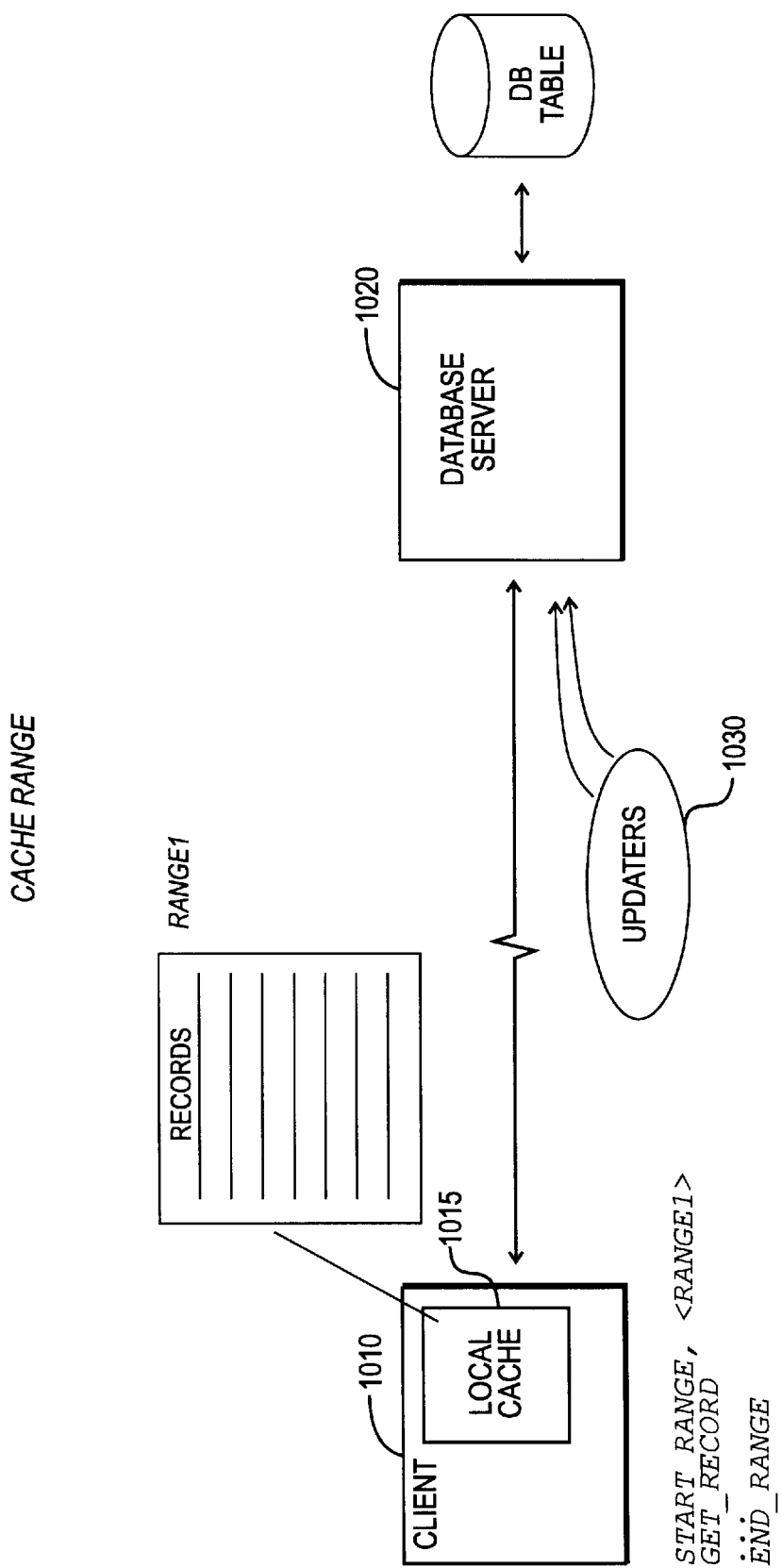
FIG. 10 illustrates the general operation of the system of the present invention, when requesting a range of records.

FIG. 10 illustrates the general operation of the system. In operation, client 1010 asks server 1020 for a range of records. In an exemplary embodiment, for instance, client 1010 may include application logic which makes this request as follows:

```
start_range, <range1>
get_record
...
end_range
```

The commands define a new range, range1, and fill that range with particular records (e.g., by repetitive calls to "get record"). After all records in all this cache range are specified, the sequence ends the range definition with an "end range" command. As the server 1020 delivers the records, the client 1010 fills its local cache 1015 with the just-retrieved records. Additionally at this point, the client can undertake other processing of the records, such as displaying them on screen to a user.

In accordance with the present invention, the client can, from that point forward, rest assured that those records remain current in its local cache. More particularly, if another updater (e.g., updater 1030) updates the database (at one of those records), the server 1020 will send notification back to the client 1010 that the range is now stale. In an exemplary embodiment, for instance, the notification is sent as an asynchronous trap (AST) indicating that range1 had been activated by another client. Alternatively, the client can set up a synchronous trap, whereupon the client will "sleep" (passing off control to other threads which are not asleep). Further description of asynchronous and synchronous event notification or alerting methodologies can be found in co-pending application Ser. No. 07/737,382, filed Jul. 29, 1991, the disclosure of which is hereby incorporated by reference.

E. Locks implemented at the server

At the server, three types of locks are employed for supporting cache ranges: record interest lock, transaction interest lock, and page interest lock. The record interest (opportunistic) lock serves to register an interest in a record, for determining whether the record has been updated. The "interest" in the record interest lock is whether a record is updated. In essence, the lock can be viewed as "lighter" than a read-only lock. This lock is a true lock in the sense that a lock is taken out by the client at the server's lock manager. Nevertheless, it is a lightweight lock in that if another client requests a lock on the record, this lock is immediately given up. Since the lower-level locking services are already available in servers, the interest lock mechanism can typically be implemented by simply adding a new lock type.

The second type of lock is the transaction interest lock. The fact that another client has updated records in the database does not in and of itself mean that a notification should be sent to the client holding the corresponding record in its cache. In particular, it is possible for another client to update a record, but do so at a point before that client has committed the underlying transaction. Sending notification before the updater commits the transaction might be premature. Specifically, if the client receives a notification immediately, upon refreshing the cache range, it will find that it gets the same records, as long as the transaction of the updater stays open. Since it is not unusual for a transaction to stay open for minutes, hours, or even days, the record interest locks are not sufficient for avoiding the problem. Therefore, a transaction interest lock is provided for notifying the client (i.e., the one with the cache range) if uncommitted records in its cache range suddenly become committed (i.e., the transaction of the updater commits).

The third type of lock is the page interest lock. While the record interest lock and the transaction interest lock are applicable in a generic fashion to client/server systems, the page interest lock is specific to desktop databases (e.g., Borland's Paradox). In a desktop (i.e., navigational) database, there generally exists an "order" for the database table, such as an index order (e.g., dBASE: SET ORDER TO lastname) or natural order. Most often, an index order will exist. Here, the client is interested not only in the set of records (i.e., the records in the cache range) but also any records which now appear between any of the records, as a result of an update. In an SQL or set-oriented system, a similar scenario could arise, if the client specifies that the set is ordered (e.g., by an SQL ORDER BY clause). If the client is displaying a screen full of customer records, the client is also interested in any update which should now appear in that range of records being viewed.

This functionality is supported through the page interest lock. Specifically, a lock is taken out on the index leaf page so that the client can be notified upon an update which inserts (or deletes) a record into (or from) the range. In an exemplary embodiment, notification occurs at the page level, not at the record level. Although such an approach might on occasion lead to false notifications, such an approach greatly simplifies implementation. Those skilled in the art will appreciate that a finer level of granularity, such as on particular record-range basis, may be implemented if desired. For navigational databases (e.g., dBASE and Paradox tables), such range locking (i.e., locking which satisfies a WHERE clause) can typically be implemented by locking particular nodes of an index. The record interest lock will be promoted or escalated to a table lock if the cache range is sufficiently large. In other words, if numerous record locks are being taken out, it is more efficient to simply take out a single table lock. Thus as an optimization, if too many record locks are taken out, the system will simply take out a single table lock instead.

Implementation of cache ranges

A. Defining the Cache Range

As mentioned above, a cache range is defined using a pair of statements resembling a BEGIN . . . END block. Between the BEGIN and END statements, the request may step through a set of records, for including them in the range. The client can, in a single operation, fetch a set of records and include them in a cache range.

1. Beginning the Range

A cache range is initiated with the following BLR verb:

text_value:=blr_begin_range, range_number

Here, range_number is a value expression which uniquely identifies the range within the scope of the request. The text_value, which is returned from the verb, represents the event name allocated by the system for the cache range. In a preferred embodiment, the event name is in the form:

ISC$RANGE_XXX where XXX is a unique id. Here, the system provides a name which is unique within the scope of the database, so that the client will not wait on another client's cache range within that database (and vice versa). The begin range_verb establishes the starting point of the range. Every record which is visited after this statement is included in the range.

2. Terminating the Range Definition

Definition of the cache range is completed with the following statement:

blr_end_range, range_number where the range_number is as defined in create_range verb. At this point, further records visited will not be included in the cache range; nor may tables be added to the range.

3. Adding a Table to the Range

The client may also decide to include an entire table within the scope of the cache range. This is accomplished through the following BLR statement:

blr_range_relation, range_number,

{blr_relation table_name\blr_rid id}

The statement is only valid between the blr_begin_range and blr_end_range range statements. Once the range is defined, any updates to the table will cause a range event to be signalled.

Definition of a cache range based on a table is typically more efficient than individual records, since only a single lock needs to be obtained. However, the operation is much less granular: any update to the table will result in a range event, whether or not the record is actually in the client cache. When a cache range is defined on an entire table, the client will generally not include individual records from the table in the range.

B. Categories of Range Events

A range event is any change to the set of records which are included in a given cache range. There are a number of ways in which a range event may occur, all of which are detected by the server.

1. Range Change

A range change occurs when records are added to or deleted from the range. A record is added to the range when a record is inserted or updated such that it falls within the range of records defined in the range. This means that the index key of the new record places it within the range, relative to the index which was in effect at the time of range definition. If no index is set at the time of range definition, the range is changed only when a record is deleted from the range.

To detect a change of records, the server takes out a read lock on the index page(s) which contain the nodes representing the records in the range. This read lock is an "interest" lock only; the index page will not actually be fetched. The receipt of a lock AST indicates that another client is updating the page and that the cache event will be posted. The server does not make any attempt to determine if the update actually occured within the cache range. Note that a change to the index page does not mean that the update has been committed. If the client receives the cache event and reestablishes the cache range before the update is committed, the update which caused the cache event to be fired will not yet be visible. The range will, however, take note of uncommitted records in the range.

For a given update, the possibility exists that two range events will be posted. If the updater is a navigational client (i.e., Borland Database Engine client), the change will typically be autocommitted and, thus, will be immediately visible. If the updater is a SQL client, on the other hand, a long-running transaction might update the record. The cache event will be posted once again when the commit occurs.

2. Record Updates

To detect updates to records in the range, the server takes out read locks on the records in the range. Denial of the record lock request indicates that another client is currently updating the record, in which case the range change event is immediately posted. If the lock is successfully obtained, then a "blocking" AST may be generated at some later time, for indicating that another client is about to update the record. This will also cause a cache event to be fired.

A SQL-type client will take out a write lock only briefly, for as long as it takes to actually update the record on page. A navigational client (e.g., Borland dBASE® client), on the other hand, will take out an explicit record lock while the user is updating the record on-screen. Since this could take a while, it is possible that the cache range cannot be reestablished successfully. On redefinition, the range event will immediately be fired to indicate that someone is about to update this record. Here, just because the record lock is requested does not mean that the change to the record is visible yet.

3. Uncommitted Changes

Locking index pages will detect changes that occur after the cache range is established, but it will not detect commit of changes which were made to the index page before the range was established. Similarly, commit of record modifications and deletes cannot be detected by record locking. In establishing the range, the server may visit records which were written by a transaction which is currently active. When the server encounters such a record, it will register interest in the transaction which made the update. It will get a shared read lock on the transaction lock of the transaction which made the update. That transaction will downgrade its lock from exclusive to shared write so that the cache range can obtain the shared read. If the transaction commits, it will convert from shared write to exclusive before it releases its lock. When the cache range receives the blocking AST, the cache event will be posted. In this case, a previously updated record in the cache range has been committed, effectively changing the cache range as viewed from the client's perspective.

4. Concurrent Updates

Since concurrent updates can occur at the time the record cache range is being set, it is possible that a lock conflict might arise during the establishment of the cache range. In this case, the server will not wait for the updates to finish. Rather, it will post the event relating to the cache range. Additional records visited prior to the blr_end_range statement will not be added to the range. The client may still retrieve records between the blr_begin_range and blr_end_range statements. There will be no notification that any of the records have changed, since the range event for this range was immediately fired on definition.

C. Posting the Event

When any change is made to the set of records included in a cache range, a range event will be posted. This is simply an server event alerter event; it can be received on the client through the normal event alerter mechanism, using the event name defined in the blr_begin_range statement. When the range event is posted, the range itself is deactivated; all locks pertaining to that range are dropped. This is to avoid trying to determine which records are still in the range and which need to be added. The approach has the additional benefit that multiple range events will not be posted from a single range definition. The client will assume responsibility for reestablishing the cache range when refetching the records in the range.

In a heavy update situation, the range event may often be signalled as soon as the range is defined. In this case, the client may continuously be refreshing records and reestablishing the range, without getting any other useful work done. In a preferred embodiment, the client is left to determine a suitable interval for refreshing the cache. If the client application does not need an up-to-the-minute copy of all records, the client might wish to take note of the cache event, but only refresh the cache after a minimum interval has transpired.

D. Dropping the Range

The client will be able to explicitly drop a range with the following BLR statement:

blr_delete_range, range_number

In a simlar manner, to drop all ranges defined in the request, the client requests:

blr_delete_ranges

All locks relating to the range will be released and all memory deallocated. These actions will also happen automatically when the request is released. It is wise to utilize this statement even if it is known that the range event has been posted. It is not necessary to use the statement if the range is to be reestablished, or if the request is about to be released.

E. Streams

For generality, the cache range does not specify a stream number. This allows records from multiple streams to be included in one cache range. Only records from navigational streams can be included in a cache range, however. Once the begin_range statement is active, single-stepping through the stream is required to define a cache range. The results of a seek greater than 1, or a find, while defining a cache range are undefined.

Internal operation of cache ranges

As previously described, the BLR statements from clients are processed by the looper routine, which acts as a big case or switch statement. When looper encounters a BLR_begin_range verb, it invokes the RNG_begin function or method. This method, which initializes a cache range in response to a client request statement, may be constructed as follows (using the C programming language).

```
 1:  DSC *RNG_begin (
 2:       NOD    node,
 3:       VLU    impure)
 4:  {
 5:  /*****************************************
 6:   *
 7:   *  RNG_begin
 8:   *
 9:  ******************************************
10:   *
11:   * Functional description
12:   *    Initialize a cache range in response to a
13:   *    bir_begin_range statement;
14:   *
15:  ******************************************/
16:  DSC   desc, *desc2;
17:  RNG   cache_range;
18:  USHORT  range_number;
19:  VEC   cache_ranges;  /* VEC is a generic container */
20:  char  event_name [RANGE_NAME_LENGTH], *p, *q;
21:
22:  // ... thread setup
23:
24:  /* extract the range number passed through BLR */
25:
26:  desc2 = EVL_expr (node->nod_arg [e_brange_number]);
27:  range_number = (USHORT) MOV_get_long (desc2, 0);
28:
```

```
29:     /* check to make sure the range number is not already in use */
30:
31:     if ((cache_ranges = request->req_cache_ranges) &&
32:         (range_number < cache_ranges->vec_count) &&
33:         (cache_range = (RNG) cache_ranges->vec_object [range_number]))
34:         {
35:         if (cache_range->rng_flags & RNG_posted)
36:             delete_range (cache_range);
37:         else
38:             ERR_post (gds_range_in_use, gds_arg_number,
39:                 (SLONG) range_number, 0);
40:         }
41:
42:     /*  generate a name unique to this particular event
43:         within this database, of the form
44:         "ISC_$RANGE_<tid>_<range_id>
45:         use the transaction id as a start, even though this
46:         event is not related to the transction per se;
47:         it is just a means of generating
48:         an id unique to the database */
49:
50:     for (p = event_name, q = "ISC$RANGE_"; *q; )
51:         *p++ = *q++;
52:
53:     /* move in the transaction id */
54:
55:     sprintf (p, "%ld_", transaction->tra_number);
56:     while (*p)
57:         p++;
58:
59:     /* move in the transaction-unique cache range id */
60:
61:     sprintf (p, "%ld", transaction->tra_range_id++);
62:     while (*p)
63:         p++;
64:
65:     /* allocate the range block and move the event name into it */
66:
67:     cache_range (RNG) ALLOCDV (type_rng, p - event_name + 1);
68:     cache_range->rng_event_length = p - event_name;
69:     strcpy (cache_range->rng_event, event_name);
70:
71:     /* fill out the descriptor to point to the event name */
72:
73:     impure->vlu desc.dsc_dtype = dtype_text;
74:     impure->vlu_desc.dsc_scale = 0;
75:     impure->vlu_desc.dsc_ttype = ttype_ascii;
76:     impure->vlu_desc.dsc_address = cache_range->rng_event;
77:     impure->vlu_desc.dsc_length = cache_range->rng_event_length;
78:
79:     /* save the range's attachment */
80:
81:     cache_range->rng_attachment = tdbb->tdbb_attachment;
82:
83:     /* put the cache range into a vector of ranges for this request */
84:
85:     cache_range->rng_number = range_number;
86:     cache_ranges
87:         = ALL vector (tdbb->tdbb_default,
88:                 &request->req_cache_ranges, EXTEND (range_number));
89:     cache_ranges->vec_object [range_number] = (BLK) cache_range;
90:
91:     /* insert the range into the list of ranges actively being created*/
92:
93:     cache_range->rng_next = request->req_begin_ranges;
94:     request->req_begin_ranges = cache_range;
95:     ++dbb->dbb_cache_ranges;
96:
97:     /* downgrade to avoid selfdeadlock if another user attaches */
98:
99:     CCH_down_grade_dbb( dbb);
100:
101:    return &impure->vlu_desc;
102:    }
```

As shown, the method is invoked with two parameters: a node data structure and an impure data structure. The node data structure corresponds to the BLR statement (i.e., from the parse tree). The impure data structure, on the other hand, serves as a buffer or data area for holding the request (i.e., from the client). This area is used for storing temporary results. At lines 16–20, local variables and data structures are declared. At line 22, thread set-up (housekeeping) is performed; for clarity of description, these details are omitted. At lines 24–27, the function or method extracts the range number from the BLR node which was passed in. Recall that the client specified this range number when invoking the BLR_begin_range verb. Lines 29–40 check to make sure that the range number is not already in use. Within a given attachment or connection, a client may define as many ranges as desired. Accordingly, the method at this point checks to make sure that the current cache_range which is being defined is not one which is already in use.

At lines 42–51, the method generates a unique name for identifying the particular event (i.e., alert event) which is associated with this cache_range. When the event is eventually sent back to the client, the client will use the name to identify the event as one which is associated with this particular cache_range being defined. This name is returned as text_value to the client, during processing of BLR_begin_range. Lines 53–57 add the transaction I.D. to the unique name; lines 59–63 add the transaction-unique cache_range I.D. to the unique name.

At lines 65–69, the method sets up the cache_range data structure, which itself is of type "range." In an exemplary environment, a "range" (RNG) data structure for storing this information may be defined as follows.

this point, this system has not visited any records yet. However, as soon as records are visited, they are added to the cache_range. At lines 97–99, the method performs housekeeping for preventing thread deadlocking. Finally, at line 101, the method returns the range name (via the general descriptor stored in the impure area).

At this point, once the range has been defined, the client would then proceed to fetch records. Client request to add records is processed by RNG_add_record which, in an exemplary environment, may be constructed as follows.

```
 1: void RNG_add_record (
 2:      RPB      *rpb)
 3: {
 4: /******************************************
 5:  *
 6:  *    RNG_add_record
 7:  8
 8:  ******************************************
 9:  *
10:  * Functional description
11:  *    Take out a record interest lock within
12:  *        all cache range(s) currently being defined.
13:  *
14:  ******************************************/
15:    RNG    cache_range, next_cache_range;
16:    VEC    record_locks;
```

```
/*   refresh range block used to store info about a particular
     set of records in a refresh range */
typedef struct rng {
     struct blk      rng_header;
     struct rng      *rng_next;         /* next in list of ranges being created */
     struct att      *rng_attachment;   /* attachment that owns range */
     struct rng      *rng_lck_next;     /* next in list of ranges
interested in a lock */
     struct vec      *rng_relation_locks;    /* relation locks */
     struct vec      *rng_relation_trans;    /* relation transactions */
     struct vec      *rng_record_locks;      /* record locks */
     struct vec      *rng_page_locks;        /* page locks */
     struct vec      *rng_transaction_locks; /* transaction locks */
     USHORT     rng_relations;      /* count of relations in range */
     USHORT     rng_records;        /* count of records in range */
     USHORT     rng_pages;          /* count of index pages in range */
     USHORT     rng_transactions;   /* count of uncommitted transactions in range
*/
     USHORT     rng_number;         /* range number */
     USHORT     rng_flags;          /* see flags below */
     USHORT     rng_event_length;   /* length of event name */
     UCHAR      rng_event [1];      /* event name to post */
} *RNG;
```

At this point, in the method, the event_name is stored in cache_range, a local copy of the RNG data structure. For purposes of event notification, a descriptor which points to the event name is stored in the impure area at lines 71–77. Here, the information is stored in a generalized descriptor which resides in the impure area. At lines 79–81, the attachment or connection information is also stored in the cache_range local data structure. At lines 83–89, the method stores the cache_range into the vector of ranges (for the current request). Specifically at this point, the method either finds the cache_range in the vector or, if not found, allocates appropriate storage for it in the vector. At line 89, the actual storage into the vector is performed.

Separately, the system maintains a linked list of cache_ranges which are in the process of being created. This tells the request that any records which are being visited need to be added to the cache_range. The REQ_ranges data structure is the linked list which hangs off the request block. At -continued

```
17: LCK     record_lock;    /* a lock data structure */
18: USHORT  i, next_range;
19:
20: // . . . threading setup code
21:
22: /*   go through all active cache ranges and establish interest in this
23:      record for that cache range */
24:
25: for (cache_range = request->req_begin_ranges;
26:         cache_range; cache_range = next_cache_range)
27:      {
28:      next_cache_range = cache_range->rng_next;
29:
30:      /*  if the range has already notified its clients of update,
31:          no need to indicate further updates */
32:
33:      if (cache_range->rng_flags & RNC_posted)
34:         continue;
```

-continued

```
35:
36:    /*  see if this cache range
37:        already has a lock on this record */
38:
39:    next_range = FALSE;
40:    if (record_locks = cache_range->rng_record_locks)
41:      for (i = 0; i < cache_range->rng_records; i++)
42:        {
43:        record_lock = (LCK) record_locks->vec_object [i];
44:        if (record_lock->lck_key.lck_long == rpb->rpb_number)
45:          {
46:          next_range = TRUE;
47:          break;
48:          }
49:        }
50:    if (next_range)
51:      continue;
52:
53:    /*  get a lock on the passed record; if we can't,
54:        don't bother to wait for it or retry, just post
55:        the event to let the client know that an update
56:        is in process--if we're lucky the lock will be
57:        released before the client tries to reestablish
58:        the cache range, otherwise we will cycle trying
59:        to establish */
60:
61:    record_lock = RLCK_lock_record (rpb, LCK_PR,
62:        (int (*) ( )) post_event_ast, (BLK) cache_range);
63:    if (!record_lock)
64:      {
65:      post_event (cache_range);
66:      delete_range (cache_range);
67:      }
68:
69:    /* place all record locks into a vector for easy access later */
70:
71:    record_locks = ALL_vector (request->req_pool,
72:                    &cache_range->rng_record_locks,
73:                    EXTEND(cache_range->rng_records));
74:    record_locks->vec_object [cache_range->rng_records]
75:    = (BLK) record_lock;
76:    cache_range->rng_records++;
77:    }
78:
79: }
```

As shown, the method is invoked with an RPB data structure—a record parameter block. This data structure characterizes the current record. This self-describes a record, including its fields and data. At lines 15–18, the function or method declares local data structures. At line 20, thread housekeeping or set-up is performed.

Next, a "for" loop is established to loop through all active cache_ranges. In particular, at this point, the method loops through all active cache_ranges and establishes an interest for this record (which is being visited) for each respective cache_range which can include this record. At the point where a record is fetched, therefore, it is also added to any cache_range which has been defined to include it.

The specific steps of the "for" loop are as follows. At lines 30–33, the method tests whether the range has already notified its client of an update. If a "change" event has already been posted, there is no need to track further records in the range; the event of interest has already occurred. In such a case, the method executes the "continue" statement at line 34, for looping to the next cache_range. At lines 36–49, the method determines whether this cache_range already has a lock on the record. Here, the method loops through the locks which have already been taken out. Note, at this point, it is more efficient to test whether a lock has been taken out for the record than it is to take multiple locks out for the record. If a lock has already been taken out, the method "breaks" out of the for loop.

Otherwise, the method proceeds to lines 53–62, for taking out a lock for the record. Specifically, at line 61, the call to RLC_lock_record invokes the lock manager of the system for taking out a protected read lock for the record. The method is invoked with a call-back (i.e., pointer to a function to call), as its third parameter. This instructs the lock manager to invoke the call-back, post_event_AST, if a request is received for the record. The call-back itself, in turn, posts the notification and releases the record interest lock.

At line 63, the method tests whether a record lock was achieved. If not, then another client is already updating the record. In such a case, the method posts the event notification (at line 65) and deletes the cache_range (at line 66). At lines 69–73, the record lock is inserted into the vector of record locks, to facilitate subsequent access. At line 74, the record lock is assigned into the vector (e.g., append to the end). Finally, at line 76, the method increments a records counter, for the current cache_range. This serves to store the current position in the record lock vector. After execution of the "for" loop, the method is done and returns (without any return value).

Recall that to add a table within the scope of a cache_range, a client issues the BLR_range_relation statement. To process this statement, looper invokes RNG_add_relation which, in an exemplary environment, may be constructed as follows:

```
 1: NOD  RNG_add_relation (
 2:        NOD         node)
 3: {
 4: /*************************************
 5:  *
 6:  *   RNG_add_relation
 7:  *
 8  **************************************
 9:  *
10:  * Functional description
11:  *   Add an entire relation to a specific cache range.
12:  *
13:  **************************************/
14: DSC    *desc;
15: USHORT range_number;
16: VEC    cache_ranges;
17: RNG    cache_range;
18: NOD    relation_node;
19: REL    relation;
20: LCK    relation_lock;
21: VEC    relation_locks;
```

```
22:
23:   // . . . threading setup
24:
25:   if (request->req_operation == req_evaluate)
26:       {
27:       /*  extract the range number
28:           and relation as passed to the engine in BLR */
29:
30:       desc = EVL_expr (node->nod_arg [e_range_relation_number]);
31:       range_number = (USHORT) MOV_get_long (desc, 0);
32:
33:       relation_node = node->nod_arg [e_range_relation_relation];
34:       relation = (REL) relation_node->nod_arg [e_rel_relation];
35:
36:       /* check to see it the range exists */
37:
38:       if ((cache_ranges = request->req_cache_ranges) &&
39:       (range_number < cache_ranges->vec_count) &&
40:       (cache_range = (RNG) cache_ranges->vec_object [range_number]))
41:           {
42:           /* lock the relation in such a way that we'll be notified
43:              if it is locked for update; if we can't get the lock just
44:              give up and post the range */
45:
46:           relation_lock = RLCK_range_relation ( request->req_transaction,
47:                       relation,
48:                       (int (*) ( )) post_event_ast, (BLK) cache_range);
49:           if (!relation_lock)
50:               {
51:               post_event (cache_range);
52:               delete_range (cache_range);
53:               }
54:
55:           /*  place all relation locks into a vector
56:               for easy access later */
57:
58:           relation_locks = ALL_vector (request->req_pool,
59:                       &cache range->rng_relation_locks,
60:                       EXTEND(cache_range->rng_relations));
61:           relation_locks->vec_object [cache_range->rng_relations]
62:               = (BLK) relation_lock;
63:           relation locks
64:               = ALL_vector (request->req_pool,
65:                       &cache_range->rng_relation_trans,
66:                       EXTEND(cache_range->rng_relations));
67:           relation_locks->vec_object [cache_range->rng_relations]
68:               = (BLK) request->req_transaction;
69:           cache_range->rng_relations++;
70:
71:           }
72:       request->req_operation = req_return;
73:       }
74:
75:   return node->nod_parent;
76:   }
```

The function or method operates in a manner similar to that described for RNG_add_record. At line 46, however, an interest lock is taken out on the entire relation. The relation or table lock gives a protected read on the entire table, for detecting when another client is updating one or more records on the table. In a manner similar to that described for record locks, a relation lock, once successfully attained, is placed in a relation lock vector. If an uncommitted record is encountered, the system must establish an interest in that record as well. When the transaction which wrote that record commits, the record immediately becomes visible. Recall that a record interest lock is taken out for detecting a change to a record once a cache_range has been established. While the cache_range is being established, the system may visit an uncommitted record. Here, it is not helpful to take out a record interest lock on the record, since the record has already been updated. Instead, what is needed is an interest lock on the transaction which wrote the record. In other words, here the interest is in when the record becomes visible—when the transaction commits. In this manner, a client which cannot see the uncommitted record will, nevertheless, be alerted once the transaction commits. The RNG_add_uncommitted_record method, therefore, is similar to the RNG_add_record method, except that it takes out a transaction interest lock instead of a record interest lock. This is shown particularly at line 69, which calls LCK_lock_non_blocking. If the lock is successfully obtained, it is added to a transaction lock vector. Otherwise, the system posts the event at line 82 and deletes the range at line 83. Thereafter, the method has completed and may return.

After the client has finished fetching or visiting records, it submits a BLR_end_range command. For processing this verb, looper invokes RNG_end which, in an exemplary environment, may be constructed as follows.

```
 1: NOD  RNG_end (
 2:         NOD          node)
 3: {
 4: /**************************************
 5: *
 6: *   RNG_end
 7: *
 8: ***************************************
 9: *
10: * Functional description
11: *   Stop adding records to cache range,
12: *   in response to a blr_end_range statement.
13: *
14: ***************************************/
15: DSC    *desc;
16: RNG    cache_range, *ptr;
17: USHORT range_number;
18: VEC    cache_ranges;
19:
20: // . . . thread setup
21:
22: if (request->req_operation == req_evaluate)
23:     {
24:     /* extract the range number from the BLR */
25:
26:     desc = EVL_expr (node->nod_arg [e_erange_number]);
27:     range_number = (USHORT) MOV_get_long (desc, 0);
28:
29:     /* check to see if the range exists */
30:
31:     if ((cache_ranges = request->req_cache_ranges) &&
32:         (range_number < cache_ranges->vec_count) &&
33:         (cache_range = (RNG) cache_ranges->vec_object [range_number]))
34:         {
35:         /*  if we've already posted the range, go ahead
36:             and delete it; otherwise stop adding locks */
37:
38:         if  (cache_range->rng_flags & RNG_posted)
39:             delete_range (cache_range);
40:         else
41:             stop_creating (cache_range);
42:         }
43:
44:     request->req_operation = req_return;
45:     }
46:
47: return node->nod_parent;
48: }
```

As shown, the method is invoked with a node parameter. As before, this parameter stores information characterizing the context of the BLR verb. At lines 15–18, local variables are declared. At line 20, thread housekeeping/set-up is performed.

At lines 24–27, the range number is extracted from the BLR node, in the manner previously described. At lines 29–33, the method checks whether the range actually exists. If the range does exist (i.e., "yes"), the method proceeds to lines 35–38 to determine whether the range has already been posted. If the range has been posted ( i.e., "yes" at line 38), the method deletes the range at line 39. Otherwise, the method invokes a stop_creating subroutine for stopping the process of adding locks. Finally, the method performs housekeeping for the looper method (which has invoked this method). Thereafter, the method is done and may return.

An actual event is posted by invoking post_event_ast. In an exemplary environment, this method may be constructed as follows.

```
 1: static void post_event_ast (
 2:         RNG       cache_range)
 3: {
```

-continued

```
 4: /**************************************
 5: *
 6: *   post_event_ast
 7: *
 8: ***************************************
 9: *
10: * Functional description
11: *   Post the event associated with the
12: *   cache range.
13: *
14: ***************************************/
15:
16: // . . . thread setup
17:
18: post_event (cache_range);
19: RNG_release_locks (cache_range);
20: }
```

As shown, the method is invoked with a range (i.e., cache_range) parameter. The method, in turn, posts the event associated with the cache_range as follows. At line 16, thread set-up (housekeeping) is performed. At line 18, a post_event function or method (described below) is invoked for this cache_range. Thereafter, the method or function releases all of the locks, by calling RNG_release_locks, at line 19. Thereafter, the method is done and may return.

The foregoing method invokes post_event which, in an exemplary environment, may be constructed as follows.

```
 1: static void post_event
 2:        RNG     cache_range)
 3: {
 4: /***************************************
 5: *
 6: *    post_event
 7: *
 8: ****************************************
 9: *
10: * Functional description
11: *      Post the event associated with the cache range.
12: *
13: ***************************************/
14: LCK   dbb_lock;
15: STATUS   status [20];
16:
17: /* detect duplicate posts and filter them out */
18:
```

```
26:        dbb_lock->lck_length,
27:        (TEXT*) &dbb_lock->lck_key,
28:        cache_range->rng_event_length,
29:        cache_range->rng_event,
30:        1);
31: }
```

The method, at lines 19–21, detects whether a duplicate post_event is occurring. If one is detected (i.e., "yes" at line 19), the method simply returns. Otherwise, the method proceeds to line 21 to set a "posted" flag for this cache_range, for indicating that the event has already been posted. Finally, at line 25, the actual event is posted, by invoking event_post. Here, the event_post method passes the previously-described unique event I.D. string to the event manager, for signalling the event.

To drop a range, the client invokes the RNG_delete method. In an exemplary environment, the method may be constructed as follows.

```
 1: NOD RNG_delete (
 2:        NOD     node)
 3: {
 4: /***************************************
 5: *
 6: *    RNG_delete
 7: *
 8: ****************************************
 9: *
10: * Functional description
11: *    Delete a previously created cache range
12: *    in response tb a BLR statement.
13: *
14: ***************************************/
15: DSC   *desc;
16: RNG   cache_range;
17: USHORT   range_number;
18: VEC   cache_ranges;
19:
20: // . . . thread setup
21:
22: if   (request->req_operation == req_evaluate)
23:        {
24:        /* extract the range number from the BLR */
25:
26:        desc = EVL_expr (node->nod_arg [e_drange_number]);
27:        range_number = (USHORT) MOV_get_long (desc, 0);
28:
29:        /* check to see if the range exists */
30:
31:        if (!(cache_ranges = request->req_cache_ranges) ||
32:           (range_number >= cache_ranges->vec_count) ||
33:           ! (cache_range = (RNG) cache_ranges->vec_object [range_number]))
34:               ERR_post (gds_range_not_found,
35:                  gds_arg_number, (SLONG) range_number, 0);
36:
37:        delete_range (cache_range);
38:
39:        request->req_operation = req_return;
40:        }
41:
42: return node->nod_parent;
43: }
```

-continued

```
19: if   (cache_range->rng_flags & RNC_posted)
20:        return;
21: cache_range->rng_flags |= RNG_posted;
22:
23: /* post the event to the interested client */
24:
25: EVENT_post (status,
```

After thread set-up/housekeeping (line 20), the method extracts the range number from the BLR node, at line 24. After checking to see if the range exists, at lines 31–35, the method invokes delete_range, at line 37. Thereafter, the method performs housekeeping and then returns control to the caller.

The delete_range method or function, on the other hand, performs the bulk of the work. In an exemplary environment, the method may be constructed as follows.

```
 1: static void delete_range (
 2:         RNG     cache_range)
 3: {
 4: /***************************************
 5:  *
 6:  *   delete_range
 7:  *
 8:  ***************************************
 9:  *
10:  * Functional description
11:  *       Release all resources associated with
12:  *       a cache range.
13:  *
14:  ***************************************/
15: VEC   cache_ranges;
16: RNG   *ptr;
17:
18: /* remove from the vector of cache ranges for the request */
19:
20: cache_ranges = request->req_cache_ranges;
21: cache_ranges->vec_object [cache_range->rng_number] = NULL;
22:
23: stop_creating (cache_range);
24:
25: if (!(cache_range->rng_flags & RNG_posted))
26:         RNG_release_locks (cache_range);
27:
28: ALL_release (cache_range);
29: --dbb->dbb_cache_ranges;
30: }
```

As shown, the method takes as its parameter a particular cache_range. The method then removes this cache_range from the vector of cache_ranges, at lines 18–21. Additionally, the method calls stop_creating, at line 23, so that no further records are added to this cache_range (in the event that this cache_range is still being defined). At lines 25–26, the method releases the locks for the cache_range. Finally, the method frees the memory and resources for the cache_range (line 28) and decrements the global counter which stores the total number of cache_ranges (for this session).

Appended herewith as Appendix A are commented source listings in the well-known C Programming Language, providing further description of the present invention. A C compiler suitable for compiling the source listings is available from several vendors, including Borland International of Scotts Valley, Calif. and Sun Microsystems of Mountain View, Calif.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

78

APPENDIX A

```
 1: void RNG_release_locks (
 2:     RNG         cache_range)
 3: {
 4: /*****************************************
 5:  *
 6:  *   R N G _ r e l e a s e _ l o c k s
 7:  *
 8:  *****************************************
 9:  *
10:  * Functional description
11:  *    Release all locks held by a cache range.
12:  *
13:  *****************************************/
14: LCK    *lock_ptr;
15: RNG    *range_ptr;
16: USHORT       i;
17:
18: /* release all the relation locks */
19:
20: if (cache_range->rng_relation_locks)
21:     {
22:     lock_ptr = (LCK*) cache_range->rng_relation_locks->vec_object;
23:     for (i = 0; i < cache_range->rng_relations; i++)
24:         {
25:         LCK_release (*lock_ptr);
26:         ALL_release (*lock_ptr);
27:         *lock_ptr = NULL;
28:         lock_ptr++;
29:         }
30:     }
31: cache_range->rng_relation_locks = 0;
32:
33: /* release all the record locks */
34:
35: if (cache_range->rng_record_locks)
36:     {
37:     lock_ptr = (LCK*) cache_range->rng_record_locks->vec_object;
38:     for (i = 0; i < cache_range->rng_records; i++)
39:         {
40:         RLCK_unlock_record (*lock_ptr, NULL_PTR);
41:         *lock_ptr = NULL;
42:         lock_ptr++;
43:         }
44:     }
45: cache_range->rng_record_locks = 0;
46:
47: /* release all page locks */
48:
49: if (cache_range->rng_page_locks)
50:     {
51:     lock_ptr = (LCK*) cache_range->rng_page_locks->vec_object;
52:     for (i = 0; i < cache_range->rng_pages; i++)
53:         {
54:         LCK_release (*lock_ptr);
55:         ALL_release (*lock_ptr);
56:         *lock_ptr = NULL;
57:         lock_ptr++;
```

```
58:            }
59:        }
60: cache_range->rng_page_locks = 0;
61:
62: /* release all transaction locks */
63:
64: if (cache_range->rng_transaction_locks)
65:     {
66:     lock_ptr = (LCK*)
cache_range->rng_transaction_locks->vec_object;
67:     for (i = 0; i < cache_range->rng_transactions; i++)
68:         {
69:         LCK_release (*lock_ptr);
70:         ALL_release (*lock_ptr);
71:        *lock_ptr = NULL;
72:         lock_ptr++;
73:         }
74:     }
75: cache_range->rng_transaction_locks = 0;
76:
77: }
```

80

```
 1: void RNG_release_ranges (
 2:     REQ         request)
 3: {
 4: /*************************************
 5:  *
 6:  *    R N G _ r e l e a s e _ r a n g e s
 7:  *
 8:  *************************************
 9:  *
10:  * Functional description
11:  *    Release the locks for all ranges in a request.
12:  *
13:  *************************************/
14: VEC   cache_ranges;
15: RNG   cache_range;
16: USHORT    range_number;
17:
18: if (cache_ranges = request->req_cache_ranges)
19:     for (range_number = 0;
20:         range_number < cache_ranges->vec_count; range_number++)
21:         if (cache_range
22:             = (RNG) cache_ranges->vec_object [range_number])
23:             {
24:             RNG_release_locks (cache_range);
25:             --dbb->dbb_cache_ranges;
26:             }
27: }
```

81

```
 1: static void stop_creating (
 2:      RNG          cache_range)
 3: {
 4: /***************************************
 5:  *
 6:  *    s t o p _ c r e a t i n g
 7:  *
 8:  ***************************************
 9:  *
10:  * Functional description
11:  *    Remove the cache range from the list of
12:  *    those being created.
13:  *
14:  ***************************************/
15: RNG   *ptr;
16:
17: /* delete the range from the list of ranges being created */
18:
19: for (ptr = &request->req_begin_ranges;
20:      *ptr; ptr = &(*ptr)->rng_next)
21:     if (*ptr == cache_range)
22:         {
23:         *ptr = (*ptr)->rng_next;
24:         break;
25:         }
26: }
```

82

```
 1: void RNG_add_uncommitted_record (
 2:     RPB           *rpb)
 3: {
 4: /*****************************************
 5:  *
 6:  *     R N G _ a d d _ u n c o m m i t t e d _ r e c o r d
 7:  *
 8:  *****************************************
 9:  *
10:  * Functional description
11:  *    Add interest in an uncommitted record version to
12:  *    any cache ranges being created.  This is done by
13:  *    registering interest in the transaction that created it.
14:  *
15:  *****************************************/
16: RNG   cache_range, next_cache_range;
17: VEC   transaction_locks;
18: LCK   transaction_lock;
19: USHORT    i, next_range;
20:
21: // ... thread setup
22:
23: for (cache_range = request->req_begin_ranges;
24:      cache_range; cache_range = next_cache_range)
25:   {
26:     next_cache_range = cache_range->rng_next;
27:
28:     /* if the range has already notified its clients of update,
29:        no need to indicate further updates */
30:
31:     if (cache_range->rng_flags & RNG_posted)
32:       continue;
33:
34:     /* if this cache range already has a lock on this record,
35:        no need to add another */
36:
37:     next_range = FALSE;
38:     if (transaction_locks = cache_range->rng_transaction_locks)
39:       for (i = 0; i < cache_range->rng_transactions; i++)
40:         {
41:           transaction_lock = (LCK) transaction_locks->vec_object [i];
42:           if (transaction_lock->lck_key.lck_long
43:               == rpb->rpb_transaction)
44:             {
45:               next_range = TRUE;
46:               break;
47:             }
48:         }
49:     if (next_range)
50:       continue;
51:
52:     /* allocate a transaction interest lock for the transaction
53:        which wrote this record version */
54:
55:     transaction_lock
56:       = TRA_transaction_lock ((BLK) rpb->rpb_transaction);
57:     transaction_lock->lck_key.lck_long = rpb->rpb_transaction;
58:
59:     /* setup a handler to pass on the event to the client */
```

83

```
60:
61:        transaction_lock->lck_ast = post_event_ast;
62:        transaction_lock->lck_object = (BLK) cache_range;
63:
64:        /* try to get a shared read on the transaction lock,
65:           which will force the holder of an exclusive lock to
66:           downgrade; this is also his notification that he
67:           needs to upgrade back to exclusive at transaction commit   */
68:
69:        if (LCK_lock_non_blocking (transaction_lock, LCK_SR, TRUE))
70:          {
71:           /* place all transaction locks into a vector */
72:
73:           transaction_locks = ALL_vector (request->req_pool,
74:                           &cache_range->rng_transaction_locks,
75:                           EXTEND(cache_range->rng_transactions));
76:           transaction_locks->vec_object
    [cache_range->rng_transactions]
77:                  = (BLK) transaction_lock;
78:           cache_range->rng_transactions++;
79:          }
80:        else
81:          {
82:         post_event (cache_range);
83:         delete_range (cache_range);
84:          }
85:         }
86: }
```

84

```
 1: void RNG_delete_ranges (
 2:     REQ         request)
 3: {
 4: /***************************************
 5: *
 6: *    R N G _ d e l e t e _ r a n g e s
 7: *
 8: ***************************************
 9: *
10: * Functional description
11: *   Delete all cache ranges in a request.
12: *
13: ***************************************/
14: VEC    cache_ranges;
15: RNG    cache_range;
16: USHORT    range_number;
17:
18: /* release all cache ranges associated with request */
19:
20: if (cache_ranges = request->req_cache_ranges)
21:     for (range_number = 0;
22:          range_number < cache_ranges->vec_count; range_number++)
23:         if (cache_range
24:             = (RNG) cache_ranges->vec_object [range_number])
25:           delete_range (cache_range);
26: }
```

85

```
 1: void RNG_shutdown_attachment (
 2:     ATT         attachment)
 3: {
 4: /***************************************
 5:  *
 6:  *    R N G _ s h u t d o w n _ a t t a c h m e n t
 7:  *
 8:  ***************************************
 9:  *
10:  * Functional description
11:  *   Release cache range locks for an attachment (i.e., ATT).
12:  *   This may be called at AST level, don't release memory.
13:  *
14:  ***************************************/
15: VEC   cache_ranges;
16: RNG   cache_range;
17: USHORT    range_number, i;
18: REQ   request;
19: LCK   *lock_ptr;
20:
21: /* go through all active requests in an attachment, see if there
22:    are any cache ranges defined.  If so, release all resources. */
23:
24: for (request = attachment->att_requests;
25:      request; request = request->req_request)
26:    if (cache_ranges = request->req_cache_ranges)
27:       for (range_number = 0;
28:            range_number < cache_ranges->vec_count;
29:            range_number++)
30:          if (cache_range
31:               = (RNG) cache_ranges->vec_object [range_number])
32:          {
33:          /* Shutdown range page locks */
34:
35:          if (cache_range->rng_page_locks)
36:             {
37:             lock_ptr=(LCK*) cache_range->rng_page_locks->vec_object;
38:             for (i = 0; i < cache_range->rng_pages; i++)
39:                {
40:                LCK_release (*lock_ptr);
41:                lock_ptr++;
42:                }
43:             }
44:          /* Shutdown range transaction locks */
45:
46:          if (cache_range->rng_transaction_locks)
47:             {
48:             lock_ptr
49:                = (LCK*) cache_range->rng_transaction_locks->vec_object;
50:             for (i = 0; i < cache_range->rng_transactions; i++)
51:                {
52:                LCK_release (*lock_ptr);
53:                lock_ptr++;
54:                }
55:             }
56:          }
57: }
```

What is claimed is:

1. In a multi-user computer system, the system including a database server maintaining on a storage device data records having data fields which store values that change in response to modifications posted by multiple clients in communication with said database server, each client maintaining a local memory buffer for caching a local copy of data records which have been retrieved, a method for notifying clients of any additions, deletions, or modifications occurring at the database server which affect validity of a range of data records cached in the local memory buffer of clients, the method comprising:

receiving at said database server a request from a particular client which defines a range of data records to fetch;

in response to said request,
(i) transferring a valid copy of data records within said range from the storage device of the server to the particular client, whereupon a valid copy of data records within said range exists in the local memory buffer of the particular client, and
(ii) registering at the database server a request to notify the particular client of any event occurring at the database server that affects said range of data records as a result of additions, deletions, or modifications posted by other clients in communication with said database server;

receiving at said database server a request from a client other than said particular client to post a change;

determining by said database server if the request to post a change specifies a change affecting said range; and if the request to post a change specifies a change that affects said range, notifying said particular client registered with said database server of occurrence of an event which has occurred at the database server which affects said range of data records.

2. The method of claim 1, wherein said request comprises a binary language representation specifying a "begin range" command, one or more "get record" commands, and an "end range" command.

3. The method of claim 1, wherein substep (ii) further comprises:

asserting a record interest lock at the databases server for each data record within said range.

4. The method of claim 3, further comprising:

escalating multiple record interest locks into a single table lock, when multiple record interest locks are asserted simultaneously.

5. The method of claim 3, wherein each record interest lock is released by the database server upon receiving a request from another client for updating the data record associated with said each record interest lock.

6. The method of claim 1, wherein said notifying step occurs as an asynchronous trap.

7. The method of claim 1, wherein said notifying step occurs as a synchronous trap.

8. The method of claim 6, wherein said particular client sleeps while awaiting said synchronous trap.

9. The method of claim 8, wherein each transaction interest lock is released by the database server upon receiving a request from another client for committing the uncommitted data records associated with each record interest lock.

10. The method of claim 1, wherein substep (ii) further comprises:

taking out a transaction interest lock at the database server for any uncommitted data records which exist in said range of data records.

11. The method of claim 1, further comprising:

in response to said notifying step, refreshing the local memory buffer by transferring a valid copy of any data record in said range which has been modified.

12. The method of claim 1, wherein said request from a particular client which defines a range of data records to fetch includes a request to notify the particular client of any modification which occurs to one or more data records in said range of data records.

13. The method of claim 12, wherein each page interest lock is released by the database server upon receiving a request from another client for committing a modified data record which now appears within said range of data records.

14. The method of claim 1, wherein step (ii) further comprises:

asserting a page interest lock at the database server for detecting a record which, after modification, appears between any of said data records of said range.

15. The method of claim 1, wherein said receiving a request which defines a range step further comprises:

creating a unique identifier for said range; and returning said unique identifier back to the particular client.

16. The method of claim 15, wherein said notifying step includes matching said unique identifier with other ranges which the particular client has requested, for determining a particular range where the modification has occurred.

17. The method of claim 15, wherein said unique identifier comprises a text string which is unique for the particular client.

18. The method of claim 1, wherein said event occurring at the database server comprises operations which insert, delete, and update records.

19. The method of claim 1, wherein said registering step includes registering an event alerter with said database server.

20. The method of claim 1, further comprising:

receiving a request from the particular client to drop the range, whereupon said database server no longer notifies the particular client of any events that affect data records in said range.

21. In a multi-user database management system, the system including a database server providing access to a database, the database server in communication with a plurality of clients, a method for notifying clients of particular events occuring in the database which render local record buffers of client stale, the method comprising:

registering with the database server a range of data records which are of interest to at least one client, each of said at least one client requiring notification of occurence of any event comprising an insert, update, or delete operation at the database server that affects said range of data records;

posting a transaction to the database server, said transaction specifying at least one operation comprising a particular event that affects said range of data records;

upon occurrence of said operation specified by said transaction, determining by the database server which clients require notification of occurence of said particular event; and sending a notification from said database server to each said at least one client which requires notification of occurrence of said particular event.

22. The method of claim 21, wherein said registering step includes:

registering an event alerter with the database server for alerting said at least one client of occurrence of an event affecting said range.

23. The method of claim 21, wherein said transaction comprises an SQL statement for updating a data record.

24. The method of claim 21, wherein said transaction comprises an SQL statement for deleting a data record.

25. The method of claim 21, wherein said transaction comprises an SQL statement for inserting a data record.

26. The method of claim 21, wherein said modification specified by said transaction occurs when said transaction commits.

27. The method of claim 21, wherein said determining step comprises:

traversing a list of ranges which have been requested by clients.

28. The method of claim 27, wherein each range of said list of ranges is uniquely associated with a single client.

29. The method of claim 21, further comprising repeating said registering step so that a plurality of ranges are registered with the database server.

30. The method of claim 21, further comprising:

in response to receipt of said notification, refreshing any local record buffer which has been rendered stale by occurrence of said particular event.

31. In a system comprising a computer network having at least one client with a processor and a memory, and the computer network including a server for storing information which may be shared by said at least one client, a method for providing access to information stored on the server, the method comprising:

allocating a buffer in the memory of said at least one client for storing information of interest, said information of interest comprising a range;

transferring certain information of interest from the server into said buffer of said at least one client and registering a request with the server that said at least one client be notified if information stored in said buffer is rendered stale;

receiving a request from another client to insert, delete, or update information at the database server;

in response to said request, determining by the database server whether information stored in said buffer is rendered stale; and if information stored in said buffer is rendered stale, notifying each said at least one client information stored in said buffer is stale.

32. The method of claim 31, wherein said notifying step occurs as an asynchronous trap.

33. The method of claim 31, wherein said notifying step occurs as a synchronous trap.

34. The method of claim 31, further comprising:

in response to said notifying step, refreshing said buffer by transferring a valid copy of any information in said buffer which has been rendered stale.

35. The method of claim 31, wherein said determining step includes:

determining whether information stored in said buffer is rendered stale by a new data record being inserted at the server into said certain information.

36. A server-based networking system with improved data access comprising:

a server having a storage device;

at least one client operably coupled to said server through a communication line, each said at least one client having a processor and a memory;

means for transferring a valid copy of a range of data records from the storage device of the server to memory of the client;

means, responsive to a request for said range of data records, for providing access to the valid copy of the range of data records in the memory of the client; and means for transmitting a notification from the server to the client when the copy is render invalid as a result of an event occurring at the server which affects validity of said copy of said range of data records.

37. The system of claim 36, further comprising:

means, responsive to said transmitting means, for refreshing the memory by transferring a valid copy of any data record in said range which has been modified.

38. The system of claim 36, wherein said event comprises an operation which performs a selected one of inserting, deleting, and updating records.

* * * * *